US006785379B1

(12) United States Patent
Rogers et al.

(10) Patent No.: US 6,785,379 B1
(45) Date of Patent: *Aug. 31, 2004

(54) CALL MANAGEMENT SYSTEM WITH CALL CONTROL FORM USER WORKSTATION COMPUTERS

(75) Inventors: Paul C. Rogers, Glendale, AZ (US); S. Thomas Emerson, Phoenix, AZ (US); John M. Saltwick, Carefree, AZ (US); John J. Daleiden, Phoenix, AZ (US); Gregory S. Wohlenberg, Tempe, AZ (US); Mark E. Fogle, Scottsdale, AZ (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/340,379

(22) Filed: Jun. 28, 1999

(51) Int. Cl.[7] .............................................. H04M 3/00
(52) U.S. Cl. ................................ 379/265.02; 379/67.1; 379/268
(58) Field of Search ........................... 379/265.02, 268, 379/67.1, 210.01, 211.01, 212.01, 213.01, 214.01, 266.01, 269

(56) References Cited

U.S. PATENT DOCUMENTS

| | | | |
|---|---|---|---|
| 4,696,028 A | 9/1987 | Morganstein | 379/88 |
| 4,809,321 A | 2/1989 | Morganstein | 379/211 |
| 4,850,012 A | 7/1989 | Mehta et al. | 379/157 |
| 4,922,526 A | 5/1990 | Morganstein | 379/157 |
| 4,935,958 A | 6/1990 | Morganstein | 379/372 |
| 4,955,047 A | 9/1990 | Morganstein | 379/112 |
| 4,975,941 A | 12/1990 | Morganstein | 379/88 |
| 5,020,095 A | 5/1991 | Morganstein | 379/67 |
| 5,027,384 A | 6/1991 | Morganstein | 379/67 |
| 5,029,196 A | 7/1991 | Morganstein | 379/67 |
| 5,099,509 A | 3/1992 | Morganstein | 379/84 |
| 5,109,405 A | 4/1992 | Morganstein | 379/89 |
| 5,166,974 A | 11/1992 | Morganstein | 379/67 |
| 5,249,219 A | 9/1993 | Morganstein | 379/84 |
| 5,274,695 A | 12/1993 | Green | 379/88 |
| 5,276,731 A | 1/1994 | Arbel et al. | 379/88 |
| 5,278,894 A | 1/1994 | Shaw | 379/67 |
| 5,303,298 A | 4/1994 | Morganstein | 379/67 |
| 5,347,574 A | 9/1994 | Morganstein | 379/210 |
| 5,384,831 A | 1/1995 | Creswell et al. | 379/67 |
| 5,408,528 A | 4/1995 | Carlson et al. | 379/211 |
| 5,434,906 A | 7/1995 | Robinson et al. | 379/67 |
| 5,448,627 A | 9/1995 | Ueno et al. | 379/67 |
| 5,465,290 A | 11/1995 | Hampton et al. | 379/67 |
| 5,488,651 A | 1/1996 | Giler et al. | 379/100 |
| 5,533,102 A | 7/1996 | Robinson et al. | 379/67 |
| 5,754,636 A | * 5/1998 | Bayless et al. | 379/142.1 |
| 5,946,386 A | * 8/1999 | Rogers et al. | 379/265.09 |

* cited by examiner

Primary Examiner—Benny Q. Tieu
(74) Attorney, Agent, or Firm—Blakely Sokoloff Taylor & Zafman LLP

(57) ABSTRACT

A Call Management System provides for management of calls directly by system users at their workstation computers via a digital data network such as a digital networks not controlled via the user's telephone instruments as in prior systems. A call management computer intercepts incoming calls and controls the handling of such calls according to instructions received from the users' workstations, which are accessed via the digital data network. Trunk circuits are monitored and controlled using digital signal processors to proactively identify the called party, the calling party and the call type (voice, Fax, data) and control and to monitor all calls. Each different type of call is managed differently and automatically through direct user workstation controls and/ or user-generated rules to provide special treatment for designated callers. Multiple calls to user at the same time may be handled with no busy signals to callers. Only one number is needed for a user to receive voice Fax and data calls. Fax and data transmissions are automatically received.

75 Claims, 12 Drawing Sheets

CALL MANAGEMENT SYSTEM WITH CALL CONTROL FORM USER WORKSTATION COMPUTERS

BACKGROUND OF THE INVENTION

This invention pertains to telephone switching systems in general.

Business communication has taken two separate paths. One involves telephone conversations and the other involving computer communication.

Until now, business telephone communications have been based upon the approach that each individual controls his own call traffic through multiple buttons on proprietary telephone instruments and/or simple commands entered through "hookflash" or the telephone keypad. Further, the architecture and philosophy applied to business PBXs or other telephone switches is limited to the "switching" of calls, such as incoming calls, to internal stations or internal stations to internal stations. This approach strictly avoids operation based upon "call content" such as the type of call, from whom it originates, etc. The limited capabilities of the multi-button telephone instruments and the lack of awareness of call content severely restrict the capabilities and features available and thus reduce the overall effectiveness of the business telephone systems of the past.

The focus of computer technology has become the desktop workstation computer attached to one or more business enterprisewide, high-speed digital networks which interconnect the workstation computers of business enterprise's employees with a variety of information servers, communications and computing devices. The business enterprise's digital network may be a combination of Local Area Networks LANs and Wide Area Networks WANs attached together via a variety of transmission media augmented by the Internet. These corporate communications worlds, i.e., business enterprise's digital networks and the public switched telephone network PSTN remain separate and distinct until now.

SUMMARY OF THE INVENTION

In accordance with the invention, a Call Management System is provided for handling business communications. The system alters the architecture and philosophy of the past, providing the users an array of new features and functions and expanded existing features.

A Call Management System provides for the real-time management of incoming voice calls by called parties. Real-time call management enables the called party to know who is calling before the call is accepted and, thus, to establish the likely priority of the call and decide how best to handle the call before his telephone rings. This method of call handling is intended to improve significantly the efficiency of the called party's interactions with customers, vendors, coworkers, and others. Each called party is notified via his/her computer terminal of each incoming call and the caller's identity, even when the called party's extension is already busy, allowing the called party to choose the appropriate handling of each incoming call before ringing the extension (hold, transfer, put through, send to voice. mail, etc.

In accordance with the invention, calls to an organization are directly controlled through networked user workstation computers, not telephone instruments, a call management computer intercepts telephone and data trunks which link the business to the telephone provider's central office. The call management computer interacts with and controls telephone and data trunks connecting with the telephone service provider.

The call management computer receives and answers all calls from the telephone provider's central office, determines the type of call voice, fax, data, determines for whom the call is intended the called party, and proactively determines who is the calling party. This information determines how the call will be handled.

Proactive caller identification is used to identify the caller by interacting directly with the caller to obtain an identifiable telephone number or the caller's spoken voice which are then identified through specialized primary or secondary Caller ID databases or a voice name database.

Call alert information is transferred via operator or digital network interconnecting workstation computer to the called party's workstation, even when the called party's telephone extension is busy. The called party instructs the call management computer via the digital network what to do with the calls in progress.

The call management computer also provides for call handling rules to be defined by the business organization or by the system users. These rules, called "VIP rules", are an adjunct to the called party's direct control and provide for special handling of important individuals, groups or even for all callers.

The call management computer either receives control commands from the called party or operates in accordance with an appropriate VIP rule and responds to the calling party accordingly by, for example, playing out recorded voice messages, receiving additional information from the caller, transferring the call to the called party, to voice mail or elsewhere either within or outside the organization.

One significant advantage of the Call Management System is that it provides system users with the many unique features and functions while requiring nothing more than simple "POTS" (plain old telephone service) telephones or headsets instead of expensive multi-button proprietary business telephone instruments.

The Call Management System also functions as an outbound call processor, working in conjunction with software in each user's workstation to provide outbound call processing services. The personal call logs can be reviewed by a user and used to return missed phone calls through a point-and-click interface. A database containing caller identification information may also be used online for outdialing calls to selected people, all without the need for manual dialing.

The Call Management System creates reusable "voice pathways" from the call management computer to the called party when it is appropriate to put a call through to a destination because of user selection or VIP rule processing. Voice pathways, once created, are reused repeatedly so long as the destination has calls in process. This enables rapid switching between calls with only the click of a workstation mouse and avoids the typical operation of establishing and tearing down entire calls in order to switch between them.

Real-time protocol conversion is provided between central office trunks and PBX trunks of the Call Management System. This allows the system to receive new or different types of services from the telephone provider while still connecting to and utilizing existing telephone systems which cannot otherwise accept the new capabilities directly. It also permits the Call Management System to utilize directly the user's telephone instruments or headsets, removing the need for a separate PBX or other switch. "Conversion" between different trunk circuits allows the system's many new features and functions to be implemented without upgrade of the organization's legacy PBX or other switch or alternatively as a replacement for an existing PBX.

The system monitors and controls the individual trunk circuits obtaining call content information and directly interacts with the caller to handle voice, Fax and data calls automatically in any combination.

A Call Management System in accordance with the invention treats all calls external and internal in the same way, allowing the transferring and conferencing of calls from inside to outside, outside to outside, or in any other combination. This removes the historical limitations on the handling of calls depending upon their source.

The Call Management System provides for the use of a single unique telephone number for each user. This "one number" is used to receive, identify and automatically handle all the user's voice, fax and data calls, one or several at a time using multiple trunk circuits. The use of only one number per user significantly reduces the costs, complexity, inefficiency and confusion of having multiple different telephone numbers for different functions.

Proactive caller identification is provided by using direct system interactions with the calling party. Predetermined messages and acquired responses are used to identify the caller for the called party. This provides the system user and call management system with knowledge of who each caller is so that appropriate priority and special handling can be applied to each call.

Specialized databases containing caller information are used to identify callers as part of Proactive Caller Identification.

The call management computer automatically answers each call, identifies the called party, determines the call type and identifies the calling party. The call management computer alerts the called party system users through the organization's local area or wide area networks or via the Internet, providing the called party direct call control via their workstation.

Users may utilize the call management system from remote locations having the same features and functions as though they were onsite.

A system user can handle multiple calls at the same time, knowing who each caller is and applying appropriate priority to each call, eliminating "voice-mail-jail" since only humans, not machines, send callers to voice mail and reducing the incidence of "telephone tag". This capability improves the user's ability to service multiple customers at the same time, as well as saves the time and costs of the otherwise inevitable "telephone tag".

In accordance with the invention, certain callers may be identified as "VIP" callers. When an incoming call is identified as originating from a VIP caller, special handling of the call is initiated. The special handling may include personalized voice messages in the user's own voice, user-generated voice "menus" for the caller, receipt of and routing based on caller-entered information, special call rerouting inside or outside, including "follow me" and "find-me" rerouting of the call to the user, even when the user is out of the office, and/or a distinctive ringing sound to alert the user. "Page me" or "Beep me" features are also included, even for calls which are routed to voice mail or elsewhere.

The system routes or conferences calls from any station directly connected to the system, connected to the system via a PBX or other switch, or connected to the system via the public service telephone network or via Internet. The Call Management System views all sources and destinations as equivalent, only differing in their technological access requirements.

"Call tags" which may be digital, text or voice messages, may be attached to voice calls by any system user to provide additional information to other system users to whom the call may be transferred or conferenced.

The Call Management System identifies and automatically receives Fax and data calls directed to each individual system user. Once received and stored in the call management database, the user is alerted to the presence of the file and allowed to transfer it to his/her workstation for further examination or use. Likewise, Faxes or data files can be sent to selected or specified receivers through the Call Management System with individualized Fax banner information for each user.

Summaries are maintained of all incoming and outgoing calls in an interactive, real-time, user-accessible "call log" portion of the Call Management Databases, allowing the called party to know who called, when they called, which calls were missed even if no voice mail or other form of message was left, and to return calls automatically through simple mouse clicks.

A single telephone call can retrieve voice messages, e-mail, Fax and data messages even though in different forms and stored in different places. Users are provided a variety of retrieval mechanisms including: sending to a remote Fax machine anywhere in the world, or sending to a remote computer. This improves the ability for traveling and at-home users to stay in touch with all their information and thus their customers and prospects.

Voice mail-jail is prevented because only humans, not machines, send callers to voice mail. The Call Management System transfers callers to voice mail when system users request or because of their VIP rules, it alerts users when voice mail exists for them to hear and it utilizes voice mail access to provide "One-Call Message Retrieval" of user's e-mail, voice mail, Fax, and data.

The Call Management System monitors the current status of all system users and makes status information available to all other system users on demand.

BRIEF DESCRIPTION OF THE DRAWINGS

The invention will be better understood from a reading of the following detailed description in which like reference numerals designate like elements and to which.

DETAILED DESCRIPTION

Figure 1:
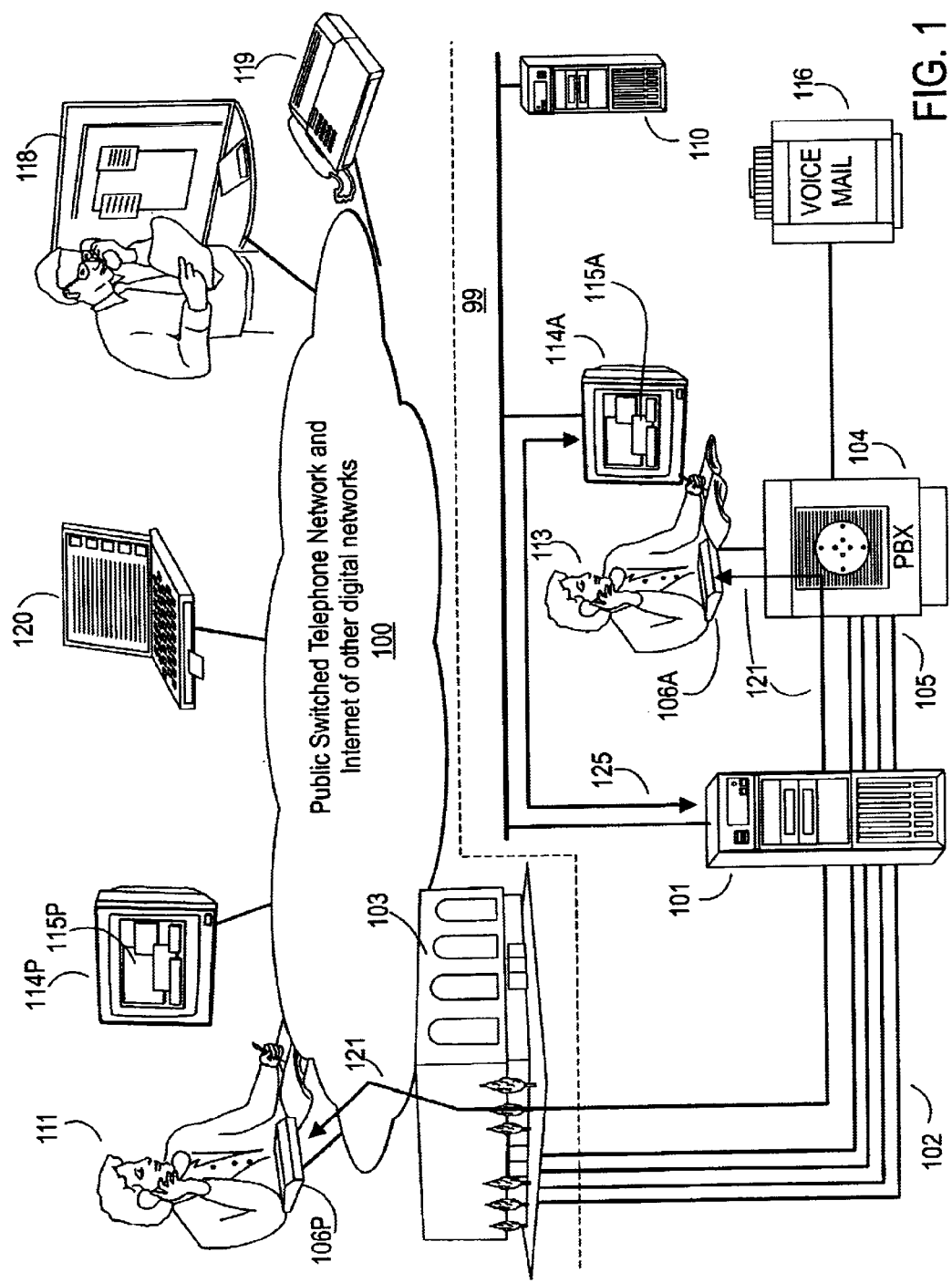
FIG. 1 is a diagram of a Call Management System.

1. Overview
   1.1 General
   1.2 CO Trunks
   1.3 PBX Trunks
   1.4 DSP Processing & Switching
   1.5 Digital Data Networks
   1.6 Call Management Databases
   1.7 Call Management Computer
   1.8 Call Reception
   1.9 Call Origination
   1.10 "One Number" Processing
   1.11 Called Party Identification
   1.12 Call Type
   1.13 Proactive Caller Identification
   1.14 VIP Rules
   1.15 Notification and Control via the Called Party's Workstation Computer
   1.16 Call Management
   1.17 "Answer" a Call
   1.18 "Transfer"
   1.19 "Send to Voice Mail"
   1.20 "Conference"
   1.21 "Hold"
   1.22 "Mute"
   1.23 "Record" and "Playback"
   1.24 "Hang Up"
   1.25 "Outdial"
   1.26 Calls Received for Non-System Users
   1.27 Predefined Call Routing
   1.28 Calls Originated by Non-System Users
   1.29 Telephone Requirements
   1.30 International CallBack
2. Voice Pathways
3. Real-Time Protocol and Signal Conversion
4. Intelligent Call Management through Real-Time DSP Voice and Data Processing and Circuit Switching
   4.1 DSP Subsystem
   4.2 Computer Signal Bus Interface
   4.3 Dual-Port RAM
   4.4 DSP Signal Processing Task
   4.5 External Connectivity
   4.6 DSP Motherboard
   4.7 DSP Daughterboard Block Diagram
   4.8 Trunk Interfaces
   4.9 PBX Connections
   4.10 Telephony Signal Buses
   4.11 Circuit Switches
5. "One Number " Reception of Voice, Fax, Data Calls
6. Proactive Caller Identification
7. Continuously-Improving Caller Identification Databases
   7.1 Calling Number Databases
   7.2 Voice Name Identification
8. Call Nofification & Control via the Digital Network Workstation Computer
   8.1 Call Notification of the Called Party
   8.2 Customer Logo
   8.3 User Status
   8.4 The Message Board
   8.5 "FAX" Notification
   8.6 "Flash" Mail Notification
   8.7 "e-mail" Notification
   8.8 "Voice-mail" Notification
   8.9 User's Call Status
   8.10 Call Alert Box
   8.11 Workstation Real-Time Call Controls and Management
   8.12 "Directory" Support
   8.13 Call Origination
   8.14 "Outside" Employee Support
   8.15 "Group Secretary" Support for Calls to Specified Groups of Employees
   8.16 "Meeting" Support for Users Away from their Workstation
   8.17 "Specialty-List" Support for Special Employee Groups
   8.18 Feature Activation
   8.19 TAPI Client
   8.20 Automatic Updating
9. Multiple Call Handling Using a Single Extension
10. User-Defined VIP Call Handling
    10.1 Temporary VIP Rule Usage
    10.2 Advanced message notification
11. Routing Calls Inside or Outside the Organization
12. "Call Tags"
13. Facsimile FAX and Data Calls
    13.1 Receiving Fax and Data Transmissions
    13.2 "FAX" Notification
    13.3 Unique Call Routing for Faxes or Data
    13.4 Special Data Calls
    13.5 Laptop Data Calls
    13.6 Outgoing Fax and Data Transmissions
    13.7 Retrieving Fax or Data files via "One-Call" Message Retrieval
14. User-Accessible Call Logs
15. "One-Call" Message Retrieval
16. Voice Mail Handling
    16.1 Transferring Callers to Voice Mail
    16.2 Alerting System Users to New Voice mail Messages
    16.3 Integrated Voice Mail Subsystem
17. User Status
18. Fault Tolerance and "Copper Bypass"
    18.1 "Copper Bypass" Fault Tolerance
    18.2 "Dual-System" Fault Tolerance 1. Overview 1.1 General FIG. 1 is an overall block diagram of one embodiment of the improved Call Management System, in which call control is provided by the user through a networked workstation computer, not a conventional telephone instrument. FIG. 1 shows the organization's environment with its Local Area Network and/or Wide Area Network (LAN/WAN), an on-site system user with a LAN/WAN based workstation, a PBX or similar switch, voice mail and a call management computer. In FIG. 1, an organization utilizing the Call Management System is clustered at the bottom of the figure and the outside world of callers and system users is clustered at the top. The organization's calls are handled using a call management computer which is placed so as to intercept telephone and data trunks between the telephone provider's central office and the organization's PBX or other switch (or as its replacement). Also shown are a work-at-home system user with workstation connected via the Internet, a voice caller at a pay phone as well as Fax and data callers all connecting through the public switched telephone network.

All central office calls ring directly into the Call Management System, the system has direct access to all information being provided by the central office. Since the system gets the "first look" at all incoming calls, it can direct and process calls according to user requirements.

In the Call Management System of FIG. 1, call control is provided through a user workstation 114 to provide new and improved capabilities for the user and substantially eliminating the shortcomings and disadvantages of past systems.

FIG. 1 shows pictorially the public switched telephone network (PSTN) with voice 118, Fax 119, a call management system 99 coupled to the public switched telephone network 100 through a telephone central office (CO) 103. The call management system 99 includes a PBX or similar switch 104 and connections to user telephone instruments 106. A digital data network 109 attaches to user workstation computers 114a–114n. The digital data network of the illustrative embodiment is a conventional Local Area Network (LAN) or Wide Area Network (WAN). In FIG. 1, two different types of system users are shown, the first is an in-house user 113 associated with workstation 114a and telephone instrument 106a while a second user is a work-at-home or traveling employee with a workstation or laptop computer 114p attached remotely via the Internet or WAN extension of the LAN 109, through ISDN or otherwise. The PSTN allows access to/from the call management system 101 via voice communication device 118, fax device 119, data 120.

A call management computer 101 is placed so as to attach to five 5 separate interfaces described below.

1.2 CO Trunks

Call Management System 99 is coupled to central office 103 via Central Office trunks 102 for both voice and data connections.

CO trunks 102 includes a variety of trunks, including analog, DID, ISDN, T-1, DID over T-1, 800/900 T-1 services, data, and Internet. The central office 103 is interconnected within the public switched telephone network 100 via Local Exchange Carriers, Inter-exchange long-distance Carriers, Cable companies, RF or satellite carriers, digital Internet providers or any other types of voice or data carriers. CO trunks 102 may include multiple individual "circuits" ISDN, T-1, etc. which carry voice and/or data for individual calls.

Voice calls over Internet and similar means are processed utilizing conventional digital techniques but are then fed into the system as though they were voice trunks. For the purposes of this description, CO trunks include Internet connections.

Call management computer 101 is configured and programmed to appear to telephone service providers 103 as though it is a business PBX or other business telephone switch and/or an Internet or other data server or node.

1.3 PBX Trunks

Within the call management system 99, PBX trunks 105 are the means by which the Call Management System 101 provides voice or data connections to system users or workstations or other devices within the business 99. For traveling or work-at-home users 111, access to the outside using CO trunks is considered just a part of PBX trunk access, e.g., voice calls to an at-home system user's 111 telephone 106p or Internet voice or data connections.

"PBX" includes a variety of different telephone switches including classical private branch exchanges PBXs, automatic call directors ACDs, key telephone sets, or integrated switches within the call management computer 101. Telephone instrument 106a–106n, as shown as physical telephones but may also include headsets, earpieces, computer sound systems, isochronous network technology such as isoEthernet and ATM, and other means of providing a voice or data connection to a user.

The call management computer 101 may attach to the organization's PBX or other telephone switch 104 through PBX trunks 105. The call management computer can sit in front of virtually any type of switch. No switch-specific hardware or software is required for integration. PBX trunks 105 may be analog, DID, DISA, ISDN, T-1, DID over T-1, 800/900 T-1 services or other available types. in all available variations and combinations. In addition, the call management computer 101 may be connected directly to the organization's telephone instruments 106a–106n or directly to the user's workstation 114a–114n for voice or data connections in place of a switch 104.

PBX trunks may or may not be of the same kind and/or number as the CO trunks 102. The Call Management System may provide a one-to-one direct relationship between CO trunks 102 and PBX trunks 105 or it may provide protocol "conversion" between differing CO and PBX trunk types and/or numbers. PBX trunks also include direct connections to the user's telephone instruments 106.

The call management computer 101 is so configured and programmed that it appears to the business PBX or other switch as though it is a central office and/or it appears to the direct telephone instruments 106a–106n as though it is a business PBX switch such as 104.

1.4 DSP Processing & Switching

Trunk interfaces 203, 206, circuit switches 204 and DSP digital signal processors 208 interact with and control the CO and PBX trunks under the overall control of the call management computer 101.

All CO trunks 102 and PBX trunks 105 are attached to the call management system through appropriate trunk interfaces 203 and PBX trunk interfaces 206. The interfaced trunk signals are further attached through circuit switches 204 and high-speed telephony buses 210 to each other and to special DSP's 208.

The configuration of the call management computer 101 with individual interface boards 203, circuit switches 204, DSP processors 208 and the high-speed buses 210 provide means for real-time sensing, switching and management of calls and the means for the call management computer 101 to appear to the central office 103, through the CO trunks 102, 202, as a business PBX 104 or other switch and/or a server computer for data functions. This configuration further permits computer 101 to appear to the business PBX or other switch 104 or to the user's telephone instrument through the PBX trunks 105, 205 as a central office switch such as 103 and/or a data server.

1.5 Digital Data Networks

Notification of events and control over multiple calls is accomplished independently of the organization's PBX or other switch system even if the user's telephone instrument 106a–106n is currently busy because the digital networks 109 are separate from and independent of the user's telephone instrument 106 or telephone system 104.

The call management computer 101 attaches to the organization's digital data network including a LAN as well as Internet and/or other external WAN networks such as Internet via interfaces. 209, 213 and 214, through which it has immediate access to the user workstations, whether in-the-office 113 or at the site of a remote user 111. These networks operate independent of whether the user's telephone instrument 106 is busy or not. The digital networks 109 are used by the call management computer 101 to alert called users such as users 111 and 113 to incoming voice calls and newly received Fax, voice or data messages and for receiving back user controls of all types from the user's workstation 114. In addition the digital networks 109 provides access to the organization's LAN server computers 110 for e-mail, voice mail, database, Internet access and other services.

1.6 Call Management Databases

The call management system 101 utilizes a variety of interactive call management databases 215 for functions including: system and user configurations, primary and secondary caller identifications and voice caller identification, VIP rules, phone directories, Fax and data file storage, voice message storage, user-accessible call logs and many other functions. These on-line, real-time databases 215 may reside on the call management computer 101 itself or elsewhere on the digital network, e.g., on a LAN-based database server 110.

The Call Management System structure of the embodiment includes call management computer 101, the CO Trunks 102, the PBX Trunks 105, the trunk interfaces 203, circuit switching 204 and DSP processing 208, the organization's digital network(s) 109, 209 and the call management databases 215. However, implementation may be in various combined or extended ways, such as when the call management computer 101 is built into the central office 103 or into a PBX or similar switch 104. The call management computer 101 may replace the PBX and control the organization's telephone instruments 106 directly.

1.7 Call Management Computer

Figure 2:
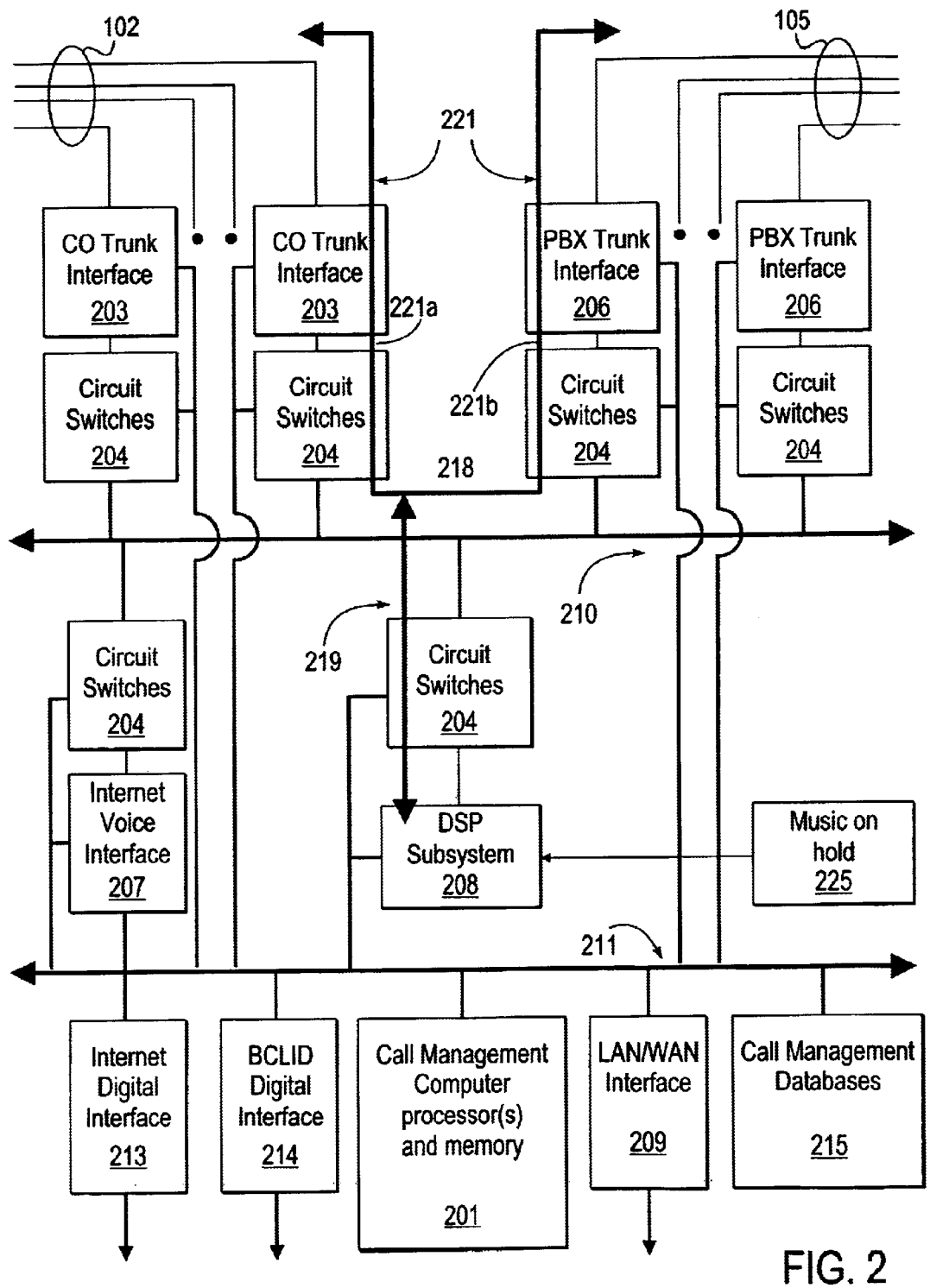
FIG. 2 is a block diagram of a call management computer.

The call management computer 101 is configured as shown in FIG. 2. It is based on an industry-standard computer with processors, memory, power supply and cabinetry. The computer 101 is coupled to a data bus 211. The data bus has connections to LAN interface 209 and disk memory which stores Call Management Databases 215. The databases may alternatively reside on the digital network system 109. The data bus 211 is connected to interfaces for Digital Internet connections 213 and bulk calling line identification BCLID data link 214 to the central office.

The telephony subsystem ties together the CO trunk 102 and PBX trunks 105 through their specific trunk interfaces 203, 206 and circuit switches 204 to the telephony signal buses 210. Each of the trunk interfaces 203, 206 is also coupled to the computer data bus 211, through which the computer processors 201 receive information and provide control and data to both the CO trunk interface 203 and its circuit switches 204. The DSP digital signal processors 208 include multiple DSPs. The multiple DSPs as needed are attached to the telephony signal buses 210 through switches 204 and to the computer data bus 211 through which they provide information to the computer processor 201 and receive back control and data e.g. voice messages to play out Lo the caller. For voice-over-Internet or similar digital connections, voice interface board 207 is connected to the computer data bus 211 and through its own circuit switches 204 to the telephony signal bus 210, through which the voice connections can be made to/from any telephone instrument 106.

1.8 Call Reception

Typical call paths 121, 221 are shown on FIGS. 1 and 2. The in-band call information from central office 103 is sent through a CO trunk 102 to the call management computer 101 where it attaches through an appropriate CO trunk interface 203 and circuit switch 204 to the telephony signal buses 210. For each trunk/circuit, the call management system assigns one or more DSP processors 208 connected to the telephony signal bus 210, to provide a monitoring and control link 219 for that call.

An incoming call such as from the payphone caller 118 or the Fax caller 119 or data callers 120 is routed through the PSTN 100 to the central office 103 and then to the call management system 99 through a CO trunk 102. The assigned DSP 208 and/or CO interfaces 203 monitor for an incoming call analog or digital signals in any available form, appropriate to the type of trunk and/or circuit.

When the call is presented by the CO 103, the call setup commands are recognized through the trunk interface 203 or through the associated DSP 208 and the call management computer processors 201 receives this information via the trunk interface 203 or DSP 208 connections to the computer signal buses 211. Control signals from the call management computer 101 then cause the call to be answered via the same route according to the trunk and circuit type.

At this point in the process, a first call path segment 221a to a DSP monitoring and control link 219 for the trunk and circuit terminates at the assigned DSP 208.

Connections to a system user 113 are created by the call management computer 101 selecting an available, appropriate CO trunk inbound 105 and establishing a call to the PBX 104 or to remote system users over additional trunk 102 to the central office 103. The PBX 104 or CO 103 responds to the call setup commands depending upon the type of trunk and circuit (including voice-over-Internet and other digital services). These are sensed by the trunk interface 203 or 206 or the assigned DSP 208 and passed to the call management computer 101. Call management computer 101 then controls the appropriate circuit switches 204 to connect the voice pathway from the calling party 118 to the voice pathway to the called party's 113 telephone instrument 106 or via a second call path segment which includes segment 218 and call path segment 221b, leaving the assigned DSP 208 attached to continue providing the DSP monitoring and control link 219.

The call is then put through in a conventional manner by the PBX 104 or CO 103 to the called party's 113 or 111 telephone instrument 106a or 106p where it rings and is answered by the called party 113 or 111 completing the connection between the caller 118 and the called party 113, 111. The typical call path 221 with the associated DSP monitoring and control link 219 is then completed as shown. The voice pathway so created may be reused as described below.

The CO trunk interfaces 203 and PBX trunk interfaces 200 and assigned DSP 208 remain active throughout a call or series of calls to a destination, watching for either end to terminate the call, by hanging up the telephone instrument, or otherwise changing the call state while the call management computer 101 watches for the system users 111, 113 to select a command changing the call's state.

1.9 Call Origination

Calls are originated by system users through their workstation 114. Such originated calls may be destined to any system user 113, 111, a non-system user, or anywhere else in the PSTN 100. Depending upon the destination, the call management computer 101 selects an available, appropriate CO trunk 102 or PBX trunk 105 and establishes the call to the CO 103 or to the PBX 104 or the telephone instrument 106 using appropriate signaling techniques for that trunk or circuit. The call management computer 101 then instructs the circuit switches 204 to connect the call circuits together, "bridging" the originator to the destination and creating the typical call path 118 in FIG. 1 and DSP monitoring and control link 119 as shown in FIG. 2.

The CO trunk interface 203, the PBX trunk interface 206 and assigned DSP 208 remain active throughout each call, monitoring for either end to terminate the call, by hanging up the telephone instrument, or otherwise to change the call state while the call management computer 101 monitors for the system user 111, 113 to select a command changing the call's state.

The call management computer 101 manages the available, appropriate CO and PBX trunks 102, 202, 105, 205 so as to share between non-system user calls established from the PBX or telephone instruments and system user 113, 111 calls established by itself.

The call management computer software runs under Microsoft's Windows NT operating system, a multi-threading, multi-tasking operating system required by the real-time call management aspects of the system. The Call Management System may be configured as a "client" to the organization's existing digital networks or as a "server" when incorporating Internet or other server functions for the digital network(s).

1.10 "One Number" Processing

For system users 111, 113, the Call Management System uses only a single DID (direct in dial) or extension number to receive all calls, voice, fax or data in any mixture and number within the limit of the number of available trunks and circuits at any time or all at the same time. The call management computer 101 is programmed to sort them out and handle each appropriately.

1.11 Called Party Identification

After a call is received, the call management computer 101 determines a destination party for the call, either automatically through reception of DID, DNIS (dialed number identification service), ISDN or other signals or messages from the central office 103 as detected by the trunk interface 203 or the assigned DSP 208 or, alternatively, a call attendant feature of the Call Management System.

In Call Attendant mode, the call management computer 101 instructs the DSP 208 to play out one or more voice messages from the call management database 215 asking the caller 118 to identify the destination party by name, spelling, extension number or otherwise. The DSP 208 receives the information from the calling party 118 and passes it to the call management computer 101 where the called party 111 or 113 is identified through the digits entered, through voice recognition or otherwise. The called party's extension number is found or verified using the call management database 215.

For voice over Internet or similar techniques, the caller is provided and fills in a "form" which includes: the name of the caller, the name of the called party and other appropriate information.

1.12 Call Type

The incoming call type voice, Fax or data is also determined using the DSP 208, which searches for appropriate signaling from the call source 118 e.g. none for voice, or CNG for Fax, specified DTMF, carrier or other signals for data whether files, video data, video conferencing, etc. in analog or digital form.

For non-voice calls to system users, the attached DSP 208 is instructed to switch to the appropriate Fax or data mode and to receive the transmission automatically for storage in the call management database 215 and later use by the called party 111, 113 or to transfer the call automatically to an appropriate extension, e.g., for video conferencing.

1.13 Proactive Caller Identification

The identity of the voice caller 118 is determined either automatically through reception of Caller ID, ISDN, ANI, BCLID or other information from the central office 103 as received by the trunk interface 203, the assigned DSP 208, the BCLID data link 214 or otherwise. Depending upon what information was received, if any, Proactive Caller Identification may then use direct interaction with the caller 118 and the Caller ID databases 215 for additional information. Proactive Caller Identification is described in Section 6 and the Caller ID databases are described in Section 7.

1.14 VIP Rules

Specific rules, called "VIP rules", are created to specify special handling for important callers, sets of callers or even for all callers. These VIP rules precede and augment direct user controls and are described in Section 10.

1.15 Notification and Control via the Called Party's Workstation Computer

Voice calls destined for system users either working in the office 113 or outside the office 111 are handled by alerting the called party at his workstation 114 through sending a message from the call management computer 101 across the digital network 109 to the user's workstation 114 and thus to the user's call management window 115 which "pops up" onto the user's workstation screen. The user then controls the call through selections made using his call management window 115 and its subscreens. This procedure, the windows and the user's functions are described in Section 8.

1.16 Call Management

Once the call type, called party and caller are identified, the call management computer 101, 201 handles these calls based first on any applicable VIP rules and then on commands from the user, via their workstation call management window 115. A call is "held" and manipulated by the call management computer 101 throughout answering of a call, identification of the call type, identification of the called party, proactive identification of a calling party, playing out messages to the caller, receiving information received from the caller, VIP rule handling and/or notification of the called party 113. The typical call pathway 221, 219 is terminated at the assigned DSP 208 and is not passed beyond.

Some of the call functions which may be exercised by a system user are described in the following paragraphs insofar as what happens with the call management computer 101. Detailed descriptions of the call management window 115 and the user's functions, controls and management using their workstation 114 are provided in Section 8.

1.17 "Answer" a Call

A system user such as user 111 or 113, may select the "Answer" function for a call announcement. If the user has no calls currently active, the call management computer 101 selects an available CO trunk (inbound trunk 105 for user 113 or outbound trunk 102, for user 111) and establishes a call to the PBX 104 or the central office 103. The PBX 104 or central office 103 responds to call setup commands depending upon the type of trunk and circuit. Call set up signaling is sensed by the trunk interface 203 or 206 or an assigned DSP 208 and passed to the call management computer 101 which then controls the appropriate circuit switches 204 to connect the voice pathway from the calling party 118 to the voice pathway 121 to the called party's 113 or 111 telephone instrument 106a or 106p, leaving the assigned DSP 208 attached as well to continue providing the DSP monitoring and control link 219.

The call is then processed conventionally by the PBX or CO to connect to the called party's 113 or 111 telephone instrument 106a or 106b where it rings and is answered by the called party 113 or 111 to complete the connection between the caller 118 and the called party 113 or 111. The typical call path 221 with the associated DSP monitoring and control link 219 is then completed as shown. The voice pathways so created may be reused as described in Section 2.

For cases where the Call Management System is connected in the central office 103 and replaces the PBX and controls the telephone instruments directly, the process is basically the same.

If a system user such as user 113 or user 111 currently has an active call, the voice pathway 121 already exists and the user's current call will be moved to "hold" or "hang Up" mode as defined by the user and the voice pathway switched immediately to the new caller (see "Transfer" below).

The CO trunk interfaces 203 and PBX trunk interfaces 206 and assigned DSP 208 remain active throughout a call or series of calls to a destination, monitoring for termination of the call by either end through hanging up the telephone instrument or otherwise changing the call state. Call management computer 101 monitors for the system users 111 or 113 to identify selection of a command from the user's call management window 115 to change the call's state.

1.18 "Transfer"

The "Transfer" function is used to cause a received call to be transferred to another destination either inside the business 99 or to any destination coupled to the PSTN 100. Transferring a call requires the user to select a "Speed-Transfer" button or a "Transfer" screen from which he may select a destination from a directory or the user may type in the phone number to use for the destination.

To transfer a call to another destination, the call management computer 101 receives a transfer message from a user's call management window 115 via the digital networks 109, the call management computer 101 instructs switches 204 to disconnect the voice path 121, instructs the appropriate trunk interface 206 to "hang up" the call to the user if appropriate and instructs the DSP 208 to return to call monitoring.

If the new destination is a system user, call management computer 101 checks for any appropriate VIP rules for this calling party and the called party and processes the call as specified by the VP rules. Otherwise, call management computer 101 alerts the called party and awaits user control.

If the destination is not to another system user, the call management computer 101 establishes a new voice pathway to the destination wherever it may be, instructs the appropriate switches 204 to connect the voice pathways together 221 and controls the trunk interface 103, 106 and the DSP 108 to monitor the progress of the call, searching for hang up or change of state at either end.

1.19 "Send to Voice Mail"

One special function provided by the call management window 115 is to send a call to voice mail whether the call is active or not. This is a special variant of the "Transfer" function with a pre-specified destination.

1.20 "Conference"

The Call Management System can conference calls independent of whether the parties are directly coupled to the PBX or are accessed via the central office 103. When a system user 113 selects the "Conference" function for an existing active call or with no active call, he then selects one or more destination parties from the call management window 115 directory and/or types in one or more telephone numbers. The call management window 115 sends a "Conference" message down the organization's digital network(s) 109 to the call management computer 101, 201, whereupon the call management computer 101 alerts the new system users.

As each called system user "Answers" the Conference call, the call management computer 101, 201 creates a new voice path 121, as appropriate, instructs the appropriate circuit switches 204 to connect the voice paths together to the assigned DSP 208, and instructs the DSPs to combine the signals appropriately to create a conference call.

For "Conference" destinations which are not system users, the call management computer 101, 201 immediately establishes a call to the destination and "bridges" the circuits, as with "Outdial" calls described below.

1.21 "Hold"

A system user can select the "Hold" function for any call currently active. The "Hold" messages are sent by the call management window 115 via the organization's LAN or WAN 109 to the call management computer 101, call management computer 101 instructs the appropriate circuit switches 204 to break both the inbound and outbound portions of the voice path 121 effectively placing a caller on "hold" but providing the user rapid access to the call through simple mouse clicks. During unused time when the calling party would otherwise be waiting, the Call Management System provides "Music on Hold" and/or corporate messages (sales, information, etc.). The caller can terminate any messages at any time by entering a "#".

1.22 "Mute"

A system user can select the "Mute" function for any call currently active. "Mute" messages are relayed via the call management window 115 and sent down the organization's LAN or WAIN 109 to the call management computer 101 which instructs the appropriate circuit switches 204 to break just the outbound portion of the voice path from the system user to the caller leaving the inbound portion active, thus muting the call.

1.23 "Record" and "Playback"

A system user can select the "Record" function for any call currently active. The "Record" messages are relayed via the call management window 115 and sent via the organization's digital network(s) 109 to the call management computer 101 which instructs the assigned DSP 208 to record the call content, sending it to the call management computer 101 which saves it to the Call Management Databases 215 for future replay.

1.24 "Hang Up"

When either calling or called party terminates a call by hanging up or by selecting the "Hang Up" function from his call management window 215, the call path 121 is dismantled by the call management computer 101 instructing the switches 204 to disconnect the voice path, instructing the appropriate trunk interface 203 or 206 and/or DSP 208 to "hang up" the call as appropriate and instructing the DSP to return to searching for a new call. However, either end currently with new calls waiting is kept active as a re-usable voice pathway.

1.25 "Outdial"

The users of the system 99 may originate calls to other users located at business 99 or to any numbers outside the business 99. The user utilizes his/her call control window 115 to identify or type in a destination for the call internal or external and then instructs the Call Management System to dial to that destination.

Workstation 114 sends the dialing control messages via the digital network(s) 109 to the call management computer 101, 201 which, in turn, causes the call to be placed using an available CO or PBX trunk/circuit 102, 105 of the appropriate type through the circuit switches 204. When a call is in process or completed to the destination, a voice path 121 is established to the calling party's telephone instrument 106.

Once established, the system user 11, 113 has available all of the system features for originated calls, as for inbound calls.

1.26 Calls Received for Non-System Users

Calls received for business 99 employees who do not have appropriate workstations or who do not choose to be system users, or for the organization's voice operator and for dedicated Fax machines and other hardware devices are immediately switched by the call management computer 101 to the PBX 104 or telephone number dialed, and are handled conventionally. For such calls, the call management computer 101, 201 selects an available and appropriate PBX trunk 105, establishes a call to the desired extension controls and the circuit switches 204 to connect the voice paths together. DSP 208 monitors progress of the call and monitors for either end to hang up. This process includes protocol conversion features for CO trunk/circuit 102, which are of different type than the PBX trunk/circuit 105.

1.27 Predefined Call Routing

Fax or data calls received for specified numbers, such as the business's base number, are accepted as though directed to a specified user, e.g., the organization's operator, who is then expected to sort out and the Faxes send them to the appropriate users or print them.

1.28 Calls Originated by Non-System Users

Calls originated by non-system users, via their PBX or through their telephone instruments controlled directly by the Call Management System, are handled conventionally except that, the call management computer 101 receives the call establishment from the PBX 104 through the PBX trunk/circuit 105 and passes it on to the central office 99 via an available CO trunk circuit 102, connecting the circuits together via appropriate circuit switches 204. The user is unaware of this process and sees no difference from conventional telephone usage.

1.29 Telephone Requirements

One significant advantage of the Call Management System is that it provides system users the many unique features and functions described here while requiring nothing more than plain old telephone services (POTS) telephones or headsets instead of expensive multi-button proprietary business telephone instruments. None of these features require the telephone instrument to be anything more than just a voice path to the user's ear and mouth.

1.30 International CallBack

The Call Management System provides a "CallBack" subsystem with which a calling party. places a call from a foreign telephone, the system receives the call and telephone number, then terminates the call and immediately dials the caller back at the number received. This process saves significant telephone expenses compared with the costs of calls from many foreign countries.

2. Voice Pathways

When a call is put through to a system user, the call management computer 101 creates a reusable "voice pathway" 121 to the called party either an in-house user 113 or an external user 111. Voice pathway switching, rather than establishing and tearing down multiple separate calls, provides the ability to switch rapidly between multiple calls, on demand, based on the user's changing priorities through simple point-and-click mouse, keyboard or menu operations.

FIG. 1 shows two re-usable voice pathways 121, one to the "in-house" system user 113 via PBX trunks 105 and the organization's PBX 104 to the user's telephone instrument 106 and another to the "at-home or traveling" system user 111 via a CO trunk/circuit 102 to the central office 103, and then via the PSTN 100 ultimately to the user's telephone instrument 106. Both of these are valid cases, even though they utilize different CO and PBX trunks of any appropriate type. Note that the Call Management System does not care whether the called party is at an in-house extension or is not directly connected to the call management system but is anywhere reachable via the PSTN or through voice over Internet or some other network.

A voice pathway 121 is created by the call management computer 101 in any of a variety of ways:

1. Placing a call through the PBX trunks 105 and the organization's PBX 104 or other switch to a called party's extension 106;
2. Activating directly a called party's telephone in the case where the call management computer 101 directly controls the telephone instruments 106;
3. Dialing out through the PSTN to a remote called party 111;
4. Connecting to a called party using an external network such as the Internet;
5. Connecting through remote links to another of the organization's PBX or other switches;
6. Passing voice over the organization's communications infrastructure within the site or external to it;
7. Playback of recorded voice messages may be done via a "Voice Pathway" created to the user's telephone instrument 106 or via the "Data Path" transferring the voice message to the user's workstation to be played out via the workstation's sound capability.
8. Any other such means which can establish a voice connection to a user's telephone instrument as defined.

Once established, the voice pathway 121 is used for the entire duration of that call and all other calls dialed or transferred to that same destination, until all such calls have been processed and the voice pathway is no longer needed.

Once a voice pathway is established to a system user such as user 113 or user 111, the calls being held in the call management computer 101 for that user may be rapidly "switched" 204 to a destination voice pathway 121 on demand as controlled by the user 113 or via the user workstation 114 through the call management window 115.

The central office trunk interfaces 203, PBX trunk interfaces 206 and assigned DSP 208 remain active throughout a call or series of calls to a destination, monitoring for either calling or called party to terminate the call or otherwise change the call state. Likewise the call management computer 101 monitors for the system user 113 to request change of the call state, e.g., "hangup", "Hold", etc. When appropriate, the call path is dismantled by instructions to the circuit switches 204 and DSP 208 from the call management computer 101.

If either calling or called party has other calls waiting, the call management computer 101 does not "hang up" that end of the call path 121. Instead it is kept so that it may be re-used as a voice pathway for the waiting calls. Otherwise, the call management computer 101 instructs the trunk interface 203, 206 and/or DSP 208 to "hang up" the call and return to waiting for another call to be presented.

Voice pathway switching, rather than requiring the establishment and tearing down of multiple separate calls as conventionally done, provides the ability to switch rapidly between multiple calls, on demand, based on the user's changing priorities.

3. Real-Time Protocol and Signal Conversion

The Call Management System provides for real-time protocol conversion between central office trunk type 102 and number and PBX trunk/circuit 105 types and number. The number and type of central office trunk/circuits need bear no direct relationship with the number and type of PBX trunk/circuits. This conversion allows the Call Management System's new and expanded features and functions to be implemented using existing telephone systems which cannot otherwise accept new telephone capabilities directly or in a cost-effective manner.

As shown in FIGS. 1 and 2, the call management computer 101 attaches to central office trunk/circuits 102 from one or more central offices 103 on the one side and through PBX trunk circuits 105 to the PBX 104 and/or directly to telephone instruments 106. Each type of CO trunk and/or PBX trunk analog, analog DID, T-1, DID over T-1, ISDN, Internet or others is attached through its own appropriate type of interface board 203, 206 which converts the trunk signals to standardized bus signals for the circuit switches 204 and telephony signal buses 210 and it also monitors various aspects of the call.

To identify both the calling party 118, 119, 120 and called party 111, 113 as automatically as possible, it would be logical for the organization to elect to subscribe to modern telephone provider services even though the organization's existing PBX cannot reasonably or cost effectively be upgraded to support such new services. One example of such new services would be ISDN PRI, where the digital "D" channel identifies the telephone number of both the calling party and the called party for each of up to 23 or 24 circuits. ISDN PRI provides a good start toward automating proactive caller identification.

While most central offices 103 can provide ISDN PRI or other new CO trunk/circuit 102, 202 services, existing PBXs 104 are customarily outfitted with old-style analog DID or even simple analog 1FB or other trunks having entirely different signaling and control requirements from the new ISDN PRI. Rather than requiring an expensive or even impossible upgrade of the existing PBX 104, the call management computer 101 provides "Conversion" of the new types of CO trunk/circuits 102 with their new signaling requirements to older PBX trunk/circuits 105 with their older signaling requirements.

New ISDN PRI services are provided by the central office 103 through the CO trunks 102 to the call management computer 101, 201 where the circuits are "converted" to older analog DID services for the PBX trunks 105 to the organization's existing PBX adding all of the Call Management System features and functions without changing the organization's existing PBX investment.

"Conversion" is made possible by the structure of the call management computer 101 with the logical and physical separation between trunks, where each different CO trunk 102 and PBX trunk 105 has its own unique trunk interface 203 and 206 which converts the unique trunk signals to standardized circuit signals for the circuit switches 204 and telephony signal bus 210. The only thing that is common is that their voice paths can be connected together, when appropriate, using the circuit switches 204 and telephony signal buses 210. The handling of trunks/circuits from one side is independent of and separate from the handling of trunks/circuits from the other, yet their voice paths can be connected together to complete the circuit whenever appropriate, coming in via one type of trunk interface, converting to standard signals and going out via an entirely different trunk interface being "Converted" en route.

Because of this "Conversion" ability, no direct one-to-one relationship need exist between the CO trunk/circuits 102 and the PBX trunk/circuits 105. A special case occurs where the call management computer 101 directly connects to and controls the organization's telephone instruments 206 with no PBX switch 204 at all.

Real-time protocol and signal conversion thus provides a crucial enabling mechanism for all of the new features and functions of the Call Management System using information available through new types of telephone provider services, while still using an existing PBX which cannot otherwise support such services. In effect, the Call Management System only requires the legacy PBX to provide voice paths to user telephone instruments, to voice mail and other devices ignoring its other existing features.

4. Intelligent Call Management through Real-Time DSP Voice and Data Processing and Circuit Switching The Call Management System's unique "Intelligent" call management capabilities are based upon the real-time sensing, control, voice and data processing provided by the call management computer's 101 configuration of DSP processors 208, central office trunk interfaces 203, PBX trunk interfaces 206 and circuit switches 204 through which circuits calls are assigned to one or more DSP processors 208 at all times. The DSPs provide real-time DSP voice and data processing which is the essential means by which the content of each call is monitored and known. The Call Management System monitors call content and uses that information to provide "intelligent" call management, unlike conventional PBXs or other telephone switches, which strictly avoid knowledge of the call content and are conceptually limited to "call switching".

The amount of DSP processing power applied up to at least 800 MIPS per system coupled with the hardware sensors of the trunk interfaces 203 allowing the Call Management System to apply a broad range of voice and data processing tasks to each and every call, processing capabilities and power not available in conventional business PBXs or similar switches.

4.1 DSP Subsystem

Each DSP subsystem consists of a DSP motherboard which attaches to the call management computer 101, 201 via the computer signal buses 211 and to the telephony signal buses 210 through circuit switches 204. In addition, the motherboard supports one to four DSP daughterboards of three DSP processors each 3, 6, 9 or 12 DSPs per subsystem with 100, 200, 300 or 400 MIPS of processing power.

Each call management computer 101, 201 utilizes one or more such DSP subsystems.

The commercially available Analog Devices DSP ADSP-2181 is used for the DSPs, operating at 16.67 Mhz 33 MIPS with 32K bytes of program RAM and 32K bytes of data RAM. DSP daughterboards are populated on the DSP motherboard as required to provide system support for broad categories of services:

"Call Monitoring" DSPs are those assigned to support the actual number of existing CO and PBX trunks, monitoring and controlling individual calls e.g. call progress monitoring, voice playback, etc. Each call monitoring DSP in this implementation typically can handle four through circuits/calls both CO and PBX sides for a total of 12 to 48 pairs per DSP subsystem.

"Special function" DSPs provide special functions as required for each specific system e.g. voice recognition, text-to-speech, etc.

Because of the anything-to-anything circuit switching capabilities of the Call Management System, DSPs can be assigned to any circuit/call as needed to support any particular function or set of functions.

4.2 Computer Signal Bus Interface

The DSP motherboard connects to the call management computer 101 through its interfaces with the computer signal buses 211 through which the call management computer's software drivers control, monitor and pass information between the call management computer processors and memory 201, the call management databases 215, the DSP motherboards and the DSP processors 208 on daughterboards.

The DSP motherboard uses an industry standard PCI bus interface with industry-standard "plug-and-play" support:

1. Assignable interrupt level
2. Assignable shared memory addressing
3. Assignable control addressing
4. Other fixed and/or dynamically changeable parameters.

4.3 Dual-Port RAM

Each DSP has its own 32K bytes of dual-port shared RAM memory which it shares with the call management computer processors 201. Thus, each daughterboard uses 96K bytes of shared memory and a fully-populated DSP subsystem uses 384K bytes of shared memory. The shared memory provides communications between the DSP and the call management computer's 101, 201 software drivers and minimizes the overhead of system interrupts external memory delay states. Shared memory is used for:

1. Passing voice buffers for voice playback and record
2. Passing Fax and data buffers
3. Providing "mailboxes" for control and status information.

4.4 DSP Signal Processing Task

Each DSP operates with its own Multi-tasking software environment, sharing the available time and MIPS among a series of tasks. The number and choice of which tasks are active at any moment depends upon the state of each of several calls the DSP is handling. Each call is itself considered a "state" machine. These tasks include:

1. DTMF decoding Dual Tone Multi Frequency, with talk-off play-off prevention
2. DTMF generation
3. MF decoding and generation
4. Call Progress decoding Dial Tone, Ring back, Busy, Fast Busy based on cadence, etc.
5. Precision Call Progress Decoding based on frequency
6. Call Progress tone generation Dial tone, Ring back, Busy
7. Analog signaling control FXO LS/GS, FXS LS/GS, E&M, E&M Wink, DPO, DPT
8. Caller ID decoding FSK modem signaling
9. Caller ID generation FSK modem signaling
10. Voice Playback messages played out to the caller
11. Voice Recording voice name for caller identification, recording of voice messages and recording of calls
12. Voice compression and decompression PCM, ADPCM, etc.
13. Conferencing of calls chimes and voice
14. CNG Fax tone detection
15. Fax Group 3 reception and transmission including CNG tone generation and special Fax identification for reception and special Fax banner for transmission for each system user
16. X.36, X.34 and other modem protocols
17. BCLID data reception
18. Text-to-speech conversion
19. Text-to-Fax conversion
20. Voice recognition
21. Name recognition voiceprint
22. Many other tasks.

Most of these DSP signal processing tasks are not typically available in conventional business PBXs or similar switches but may available in interactive voice response and similar equipment. In the future, many more voice and data processing tasks will be added to the Call Management System's DSP processors 208, significantly expanding the functions and features of the Call Management System.

4.5 External Connectivity

Each DSP motherboard also supports the following external connections:

1. External audio connection for "music-on-hold"
2. External audio microphone input which can be used for voice recording if desired
3. External headphone connection so that calls in progress can be monitored for debug purposes
4. Status LEDs red and green for self-test, board diagnostics and operational external notification
5. "Stay-alive" signal for the "copper bypass" unit.

4.6 DSP Motherboard

Figure 3:
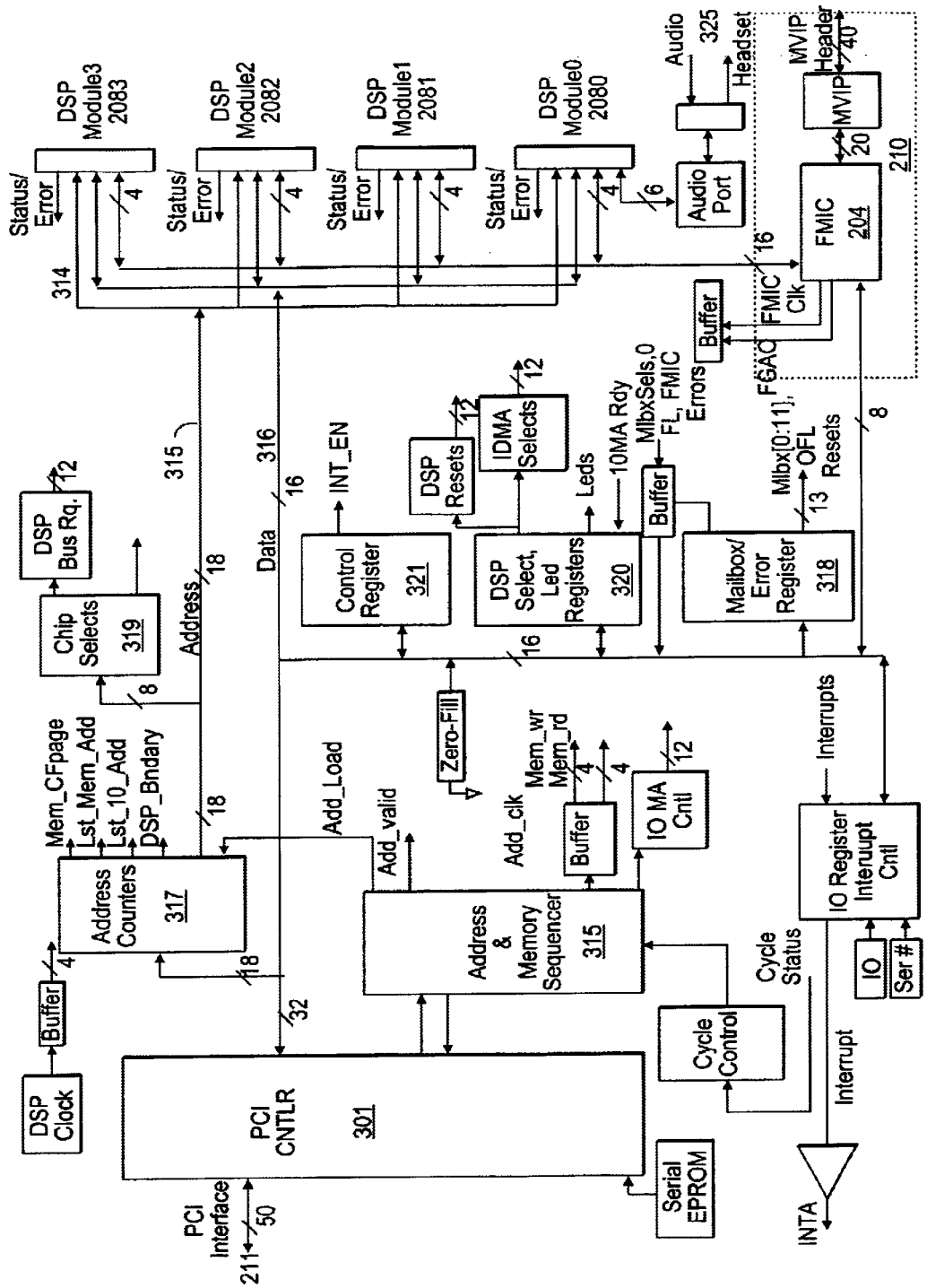
FIG. 3 is a block diagram of a digital signal processor.

FIG. 3 shows the DSP motherboard block diagram. The DSP motherboard functions primarily as an interface between the computer signal buses 211, the telephony signal buses 210, the DSP daughter boards and their DSPs 308 and internal decoders, sequencers and logic. This architecture utilizes common internal address and controls 315 and data 316 signals from the PCI interface 301 connecting the call management computer's 201 PCI bus 211 to essentially everything on the motherboard 208 and through it to the DSP daughterboards. Each motherboard 208 includes:

1. The FMIC telephony bus circuit switches 204 which provide signal paths to/from the telephony signal buses 210 and the DSP processors 208
2. The address counters 317, chip select circuits 319 and address and memory sequencer 318 which manages the on-board controls
3. DSP and FMIC controls are handled via DSP selects 320, interrupt control register 321 and the mailbox and error register controls 322
4. External audio input for music on hold and headset for debugging are provided 225 by a separate audio circuit.

Each daughterboard interface consists of:

1. Address bus 315
2. Data bus 316
3. Telephony voice circuits 313
4. Status and error signals to the DSP motherboard buffers and logic 314.

4.7 DSP Daughterboard Block Diagram

Figure 4:
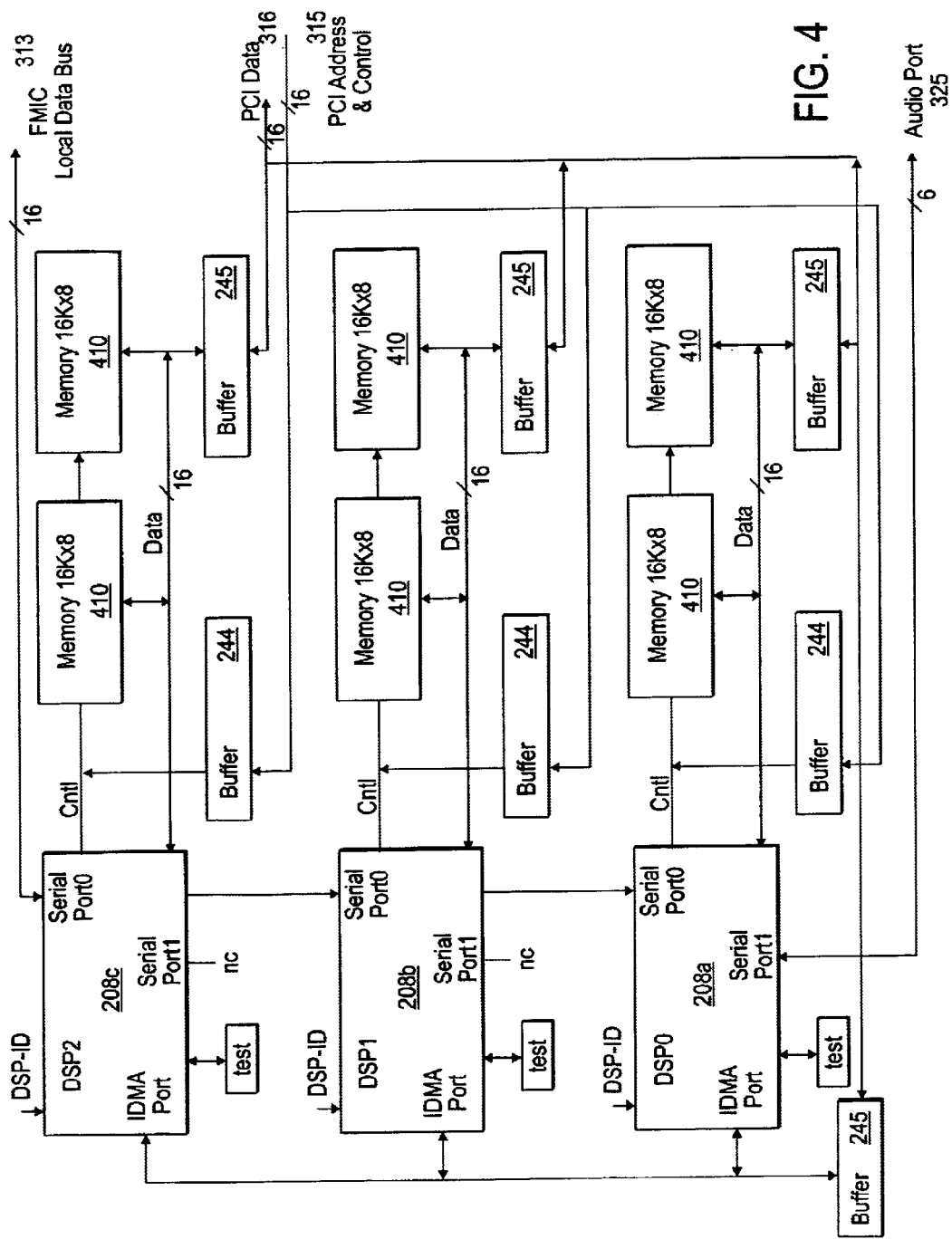
FIG. 4 is a detailed block diagram of a portion of the digital signal processor of FIG. 3.
Figure 5:
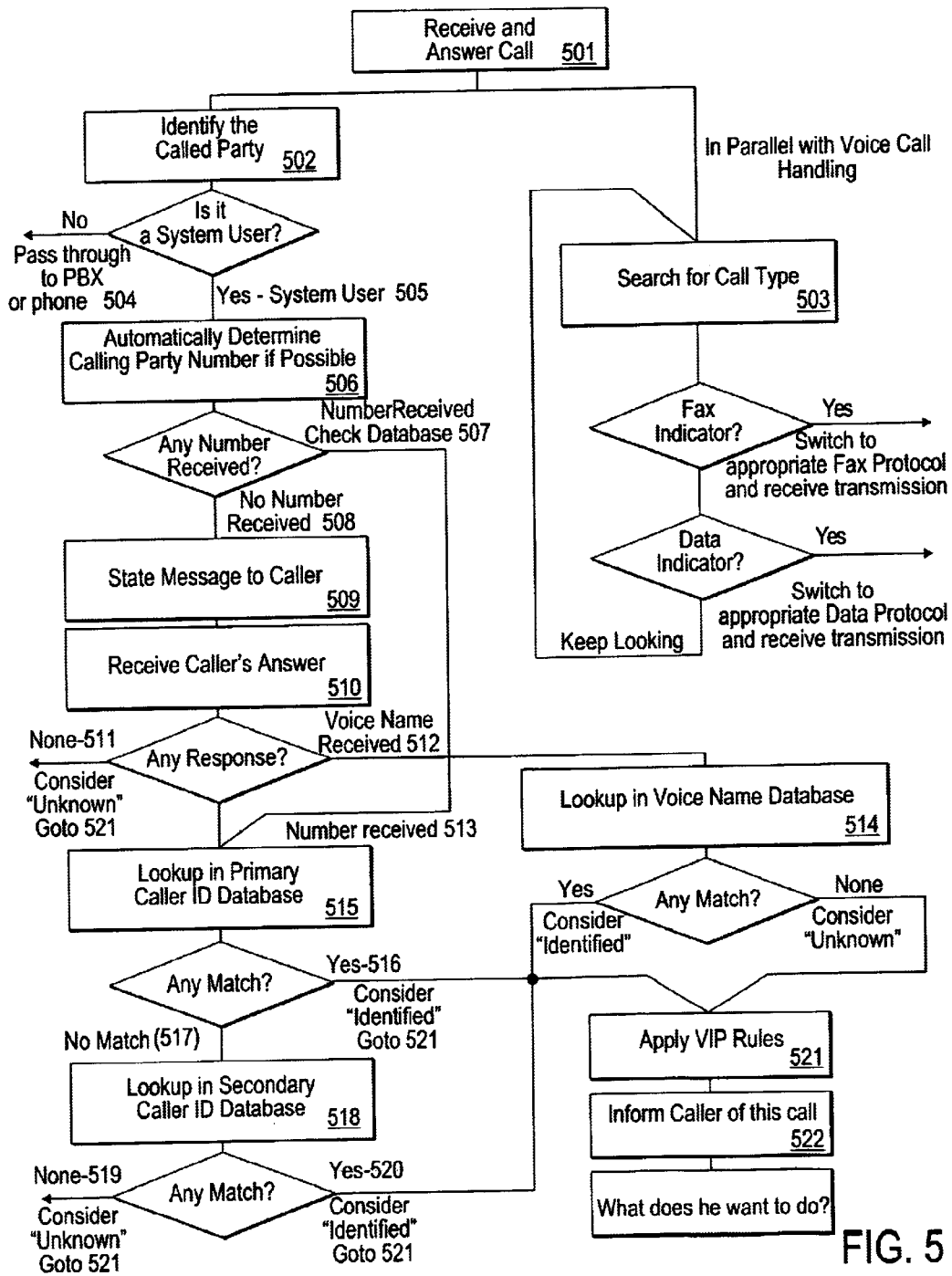
FIG. 5 is a diagram showing how callers are identified.

FIG. 4 shows the DSP daughterboard. Each daughterboard 2081, 2082, 2083, and 2084 attaches to the DSP motherboard 208 through the daughterboard interfaces address lines 315, data lines 316, telephony circuit buses 313 and status/error lines 314. Each DSP 208, 308, 408 has its own dual-port RAM data memory 410 accessible either from the DSP or from the call management computer 101, 201 via the PCI motherboard interface 301.

4.8 Trunk Interfaces

The call management computer's 101, central office trunk interfaces 203 support one or more trunks per board, depending upon the type of trunks, with varying number of circuits per trunk typically 1 or 2 T-1 or ISDN PRI to 24 analog, DID or stations. The trunk interfaces 203, 206 provide a variety of different connections, interfaces and features, as is appropriate for each different type, including the following central office and PBX connections:

A. Central Office Connections
1. Loopstart—Ringing detection
2. Loopstart—Loop current detection
3. Loopstart—Loop current direction
4. Loopstart—On/Off hook control
5. Loopstart—Hookflash generation
6. Groundstart—Ringing detection
7. Groundstart—Loop current detection
8. Groundstart—Loop current direction
9. Groundstart—On/Off hook Control
10. Groundstart—Hookflash generation
11. Groundstart—Ring ground seizing trunk for outdialing
12. Groundstart—Tip ground detection of seized trunk
13. AnalogDID—Battery power to trunks
14. AnalogDID—Loop current detection
15. AnalogDID—Battery reversal wink generation
16. AnalogDID—Reverse battery answer supervision identifying when the call is answered and when the station side disconnects
17. AnalogDID—DID decoding of DTMF signals
18. T-1 Trunks—Signaling type E&M Wink and Immediate, loopstart, groundstart
19. T-1 Trunks—Wink generation
20. T-1 Trunks—"robbed-bit" signal decoding
21. ISDN PRI—"D" channel digital support 4.9 PBX Connections
1. Loopstart—Battery power to trunk
2. Loopstart—Ringing generation
3. Loopstart—Loop current detection
4. Groundstart—Battery power to trunk
5. Groundstart—Ringing generation
6. Groundstart—Loop current detection
7. Groundstart—Loop "open" for idle state
8. Groundstart—Tip Ground seizing trunk for outdialing
9. Groundstart—Ring Ground Detection of PBX initiating call
10. AnalogDID—Loop current detection
11. AnalogDID—Loop current direction detection for wink and answer supervision
12. AnalogDID—On/Off hook control
13. AnalogDID—DID transmission via DTMF
14. T-1 Trunks—Signaling type E&M Wink and Immediate, loopstart, groundstart
15. T-1 Trunks—Wink generation
16. T-1 Trunks—"robbed-bit" signal decoding
17. ISDN PRI—"D" channel digital message support 4.10 Telephony Signal Buses In this implementation, the Telephony signal buses are based on the industry standard Multi-Vendor Integration Protocol (MVIP) which provide for 256 bi-directional voice/data channels, divided into 16 uni-directional or 8 bi-directional "streams" of 32 time slots each, operating at 2.048 Mhz. However, the buses could just as well have been based on SCSA, PEB or other types of available standards or conventions_so long as "clear", full-bandwidth circuit paths are provided among the trunk interfaces 203, 206, 207, the DSPs 208, and their circuit switches 204.

4.11 Circuit Switches

Trunk interfaces 203, 206, the Internet voice interface 207, DSP 208 and others boards connect to the telephony signal buses 211 through their own circuit switches 214. The circuit switches are the FMIC Flexible MVIP Interface Circuit. The FMIC connects the specified time slots of the telephony signal buses 210 to/from the "on-board" internal circuitry.

At any time, the call management computer's software drivers can change the circuit switch 204 settings using commands through the computer signal buses 211. This is the means through which calls/circuits/voice paths are dynamically "switched" from one point to another, placed on "hold", or otherwise as described elsewhere.

5. "One Number" Reception of Voice, FAX, Data Calls

Without changing existing information and telephone systems, the Call Management System provides a single, unique "One Number" for each system user which is his "personal point-of-contact" and "never busy" telephone extension (his Telco DID or equivalent number or his call attendant or DISA extension number) for all voice, FAX and data communications. This "one number" is used to receive, identify and automatically handle all the user's voice, fax and data calls, one or several at a time using multiple trunk circuits, even when the user is on his/her telephone. Thus, user telephone extensions are converted into a "never busy" extension for voice, e-mail, FAX and data with direct control from the desktop computer where users exercise direct, real-time control of all calls including call queuing with multiple calls on hold, call transfers, call forwarding and other forms of real-time call processing not currently available. The use of only one number per user significantly reduces the costs, complexity, inefficiency and confusion of having multiple different telephone numbers for different functions.

The Call Management System uses only a single DID or extension number for each user such as user 111 or user 113 to receive all their direct calls, voice, fax or data in any mixture and number within the limit of the number of available trunks and circuits. Various calls to a system user may occur at any time or several may occur at the same time.

The Call Management System uses only a single DID or extension number for each user 111 or 113 to receive all direct calls, voice, fax or data in any mixture and number within the limit of the number of available trunks and circuits. Various calls to a system user may occur at any time or several may occur at the same time. The call management computer 101 is programmed to sort them out handle each appropriately, all at the same time. This "One Number" feature is a significant improvement over the conventional use of multiple numbers for different functions.

FIG. 1 shows four different types of callers: an outside voice caller 118, an inside voice caller 113, an outside Fax caller 119 and an outside data caller 120. These callers all use the same "One Number" to call the same system user 111 and they may do so all at the same time.

So long as a sufficient number of trunks or trunk circuits are available, all of the outside calls will be routed through the PSTN 100 to the CO 103 where they will be sent to the organization via the CO trunks 102, 202 and presented to the call management computer 101. When the calls arrive even if all arrive at the same time, their trunk interfaces 203, 206 and the assigned DSPs 108 receive and answer ALL the calls, determine the called party DID, ISDN or otherwise and determine the call type, voice, Fax or data.

For Fax or data calls, the call management computer instructs the attached DSP 208 to establish a FAX or data call session and to receive the transmission. When complete and stored on the Call Management Databases 215, the call management computer 101, 201 alerts the called party to the new Fax or data files.

For each voice call received from outside, the call management computer 101 with assigned DSP 208 proceeds with proactive caller identification, checks for applicable VIP rules and alerts the called party to the call even if other calls are currently active or waiting.

Thus, for each system user only "One Number" is needed to receive all voice, Fax and data calls from outside or inside with the Call Management System able to identify and handle each type appropriately, even if multiple calls for the same party arrive concurrently.

This "One Number" ability of the Call Management System removes the typical requirement for each user to have expensive, separate telephone lines and equipment for each different type of call and it also prevents the conventional "busy" signal being received by callers, improving efficiency and obviating starting telephone tag.

6. Proactive Caller Identification

Proactive Caller Identification is the means whereby the Call Management System augments and improves central office-delivered calling party identification. Even with no central office-delivered calling party identification, Proactive Caller Identification can identify the called party. Call Management System configurations are provided for organizations which can include one or more forms of called party identification from their telephone providers and those which cannot. However, even for those which can, the correct caller identification using central office-delivered information occurs for only a modest fraction of all calls, not from blocked lines, pay phones, cellular phones, etc. thus, proactive caller identification is required in any case.

If no or unusable calling party identification is provided by the telephone service provider, A Proactive Caller Identification of the Call Management System requests the calling party to provide identification of the caller to the called party. Call management computer 101 utilizes a DSP 108 to access a call management database 215 message to be provided to the calling party 118. A typical message is:

"So that I may inform Mr. Johnson of your call, please enter your home of office telephone number or state your name."

The calling party identifies himself through one of several means:

telephone keypad entry of an identifiable telephone number;

telephone keypad entry of an identifiable business number with attached extension number;

telephone keypad entry of a unique assigned PIN number; or speaking his/her name with subsequent voice recognition by the call management computer.

Proactive Caller Identification is described using FIGS. 1 and 2.

A typical voice call to a system user might well originate from an outside caller at a payphone 118. The PSTN 100 routes that call to the central office 103 which, in turn, presents the call to the Call Management System via the CO trunks 102 and through the trunk interface 203, circuit switches 204, and telephony signal buses 210 to the DSP 208.

For businesses, the forms which CO-provided calling party identification take are limited, although growing. These include:

1. Caller ID containing the telephone number and/or name of the billed party in FSK;
2. ISDN providing both the calling and the called party's numbers as part of the "D" channel communications;
3. ANI DTMF or FSK provided by inter-exchange carriers with some 800/900 services;
4. BCLID Bulk Calling Line Identification, in which a BCLID data line from the central office is used by the central office to provide the calling number;
5. Transmitting the calling number along with the DID number in either DTMF or FSK form.

When a call is received 501, two different and parallel functions are started, identification of the called party 502 and identification of the call type 503. The calling party will. be identified. Identification occurs through receipt of the calling party's extension DID after "wink" or T-1 in-band signaling or telephone number ISDN "D" channel signal or via other signaling means.

When the auto attendant mode is used, the DSP 108 accesses the call management databases 215 to play a message to the caller 118. Entry is made of the called party's extension number or name encoded from the telephone keypad or the name of the called party may be spoken and then recognized utilizing conventional auto attendant steps.

If the called party is not a system user 504, the PBX 104 is used to process the call in the form required by the PBX trunks 105 and the call is switched over switches 204 via the telephony signal bus 210 to the specified number for conventional treatment.

If the called party is a system user 505, the calling party's telephone number is determined 506 automatically through the receipt of a name or number from the list above.

If a caller identification is received 507 the identification number is compared with the Primary Caller Identification Database.

If no automatic detection of caller identification occurs 508, the system provides a pre-recorded message to the caller 509 such as the one above. The requested information is received by the attached DSP 208 and used in subsequent identification.

If no response 511 is received the caller is considered "unknown" 521.

If the name was spoken 512, the call management computer 101 compares the name with entries in a voice identification database 214. If the name corresponds to one in the voice identification database 214, the calling party is identified 521. If the corresponding name is identified, the caller is "unknown", the recorded name is retained during the call, in case the user wishes to have the name added to the voice identification database 521 for future calls.

If a telephone keypad entry was made 513, the entry is used as an index into the Primary Caller ID Database 515.

If a match is found in the Primary Caller ID Database 516, the caller is identified as the party in the matching database record.

If a match is not found in the Primary Caller ID Database 517, the entry of a telephone number is used as an index into the Secondary Caller ID Database 518.

If a match is not found in the Secondary Caller ID Database 519, logic goes to step 521 with the caller considered "unknown". If a match is found in the Secondary Caller ID Database 520 the caller is identified as the party or business matching the Secondary Caller ID Database entry.

Step 521 represents the end of proactive caller identification. At that point, the call is handled according to any appropriate VIP rules 521 and/or the called party is alerted to the presence of the call 522.

This basic procedure can be accomplished with many variations which provide the same results but may add, move or remove various steps to accomplish it, e.g., obtaining information from the caller can be done through a series of different requests and responses, not just the efficient single one described above, or auto attendant identification of the called party can be done following caller identification, instead of before.

Additional Proactive Caller Identification capability is provided to a called party once a call is received whether identified or unknown, by "double-clicking" a toolbar button requesting "More Identification", e.g., a caller identified only as from "General Motors" may give too little information to the called party. Selecting the button to request "More Identification" causes Proactive Caller Identification to request a different number from the caller so that he may be more closely identified as "Mr. Jones" calling from "General Motors".

Voice calls arriving through Internet or other similar digital networks are identified using a "form" presented to the calling party, which he fills out providing the needed calling party information.

7. Continuously-Improving Caller Identification Databases 7.1 Calling Number Databases Identification of a calling party, e.g., party 118, from the calling party's telephone or PIN number or other entries is accomplished with two Caller ID Databases which are part of the overall Call Management Databases 215. A Primary Caller ID Database is dynamic and continuously updating. It includes names, telephone numbers and/or affiliations of callers to the organization, including employees, and is automatically searched by the call management computer 101 first as soon as a number is known or through Proactive Caller Identification. If a match is found, the name from that entry is used by the Call Management System in subsequent VIP processing or to alert the called party.

The Primary Caller ID database contains specific entries relevant to individual system users, e.g. for system user John Adams, the automatically identified business number from one site of General Motors is assigned to Mr. Jones, but for a different system user, Sam Archer, that same General Motors site number is assigned to Sarah Smith. Since both entries will match the automatically identified number, the one matching the called party will be chosen. A further extension of this process includes numbers not assigned to an individual system user, but to their group or even to the entire organization. All of these are matched to the calling party and the one most appropriate for the called party is chosen. One reason for this process is that all calls from an entire business site are customarily identified by the billing number for the site's PBX, not by individual. Thus, this procedure increases the probability of correct identification of callers based upon who they are calling.

A second variation includes alerting the called party using all of the matching names and allowing the called party to select which one actually is calling, removing the others.

If no match is found in the Primary Caller ID Database, the Secondary Caller ID Database is searched. It contains a commercially available list of individual and business names and telephone numbers or an extraction from such a list. If a match is found to the Secondary Caller ID Database, the name and/or affiliation and number is transferred to the Primary Caller ID database to be used for subsequent calls. If no match is found, the caller is finally considered "unknown".

With or without a call present, the called party, such as user 111 or user 113, may use his workstation's call control window 115 to update or correct the Primary Caller ID Database for a caller or add a new caller to the database using any of the following indexes:

1. Home telephone number;
2. Business telephone number;
3. Business telephone number plus the person's extension;
4. Special PIN numbers assigned to or selected by callers;
5. Voice mailboxes for users;
6. Special coded entries including the * and # keys; and
7. Other indexes.

With or without a call present, the called party 111 or 113 may use the workstation call control window 115 to update or correct the Primary Caller ID Database for a caller, or add a new caller to the database.

7.2 Voice Name Identification

Voice name identification is accomplished through a comparison of pre-recorded spoken names in a Voice Name Database which cross-references the person's name, affiliation and phone number similar to the Primary Caller ID Database.

The user can have a current caller speak their name, which is then recorded by the DSP 108 and stored by the call management computer 101, 201 in the Voice Name Database for future use. Alternatively, if the caller had spoken their name at the beginning of the call when requested, that saved recording may be used for the Voice Name Database.

Thus, the Primary Caller ID Database and the Voice Name Database are continuously updated both automatically and through user action, becoming ever more effective in identifying callers.

8. Call Notification & Control Via the Digital Network Workstation Computer

The Call Management System provides intelligent call management through which calls are handled by called parties using their workstation computer, not the telephone instrument as with conventional business PBX or other telephone systems. A called party, such as user 111 or user 113, controls one or many concurrent calls directly through a call control window 115 displayed on a workstation 114. Section 1 describes the actions taken by the call management computer 101 and the relationships of calling parties and called parties for many of the specific user control examples. This section describes the user interactions at their workstations 114 using the many aspects of their graphical user interface call management window 115 and its subsidiary screens. FIGS. 6a–6e show the call management window and selected subsidiary screens. It is understood that different combinations and organizations of screens, layouts, buttons, etc. can be configured to provide the user his many Call Management System features and functions. Thus, the implementation shown and described is but one of many potential graphical user interface layouts which could be used to implement the user aspects of the Call Management System.

8.1 Call Notification of the Called Party

When a call arrives for a system user, the call management computer 101, in concert with its DSP processors 208, identifies the called party, the call type and the calling party as described in Sections 1, 6 and 7. For voice calls, the call management computer 101 reviews any applicable VIP rules from the Call Management Databases 215 and, if none apply, to divert or affect the call, and the called party is in an appropriate "available" status, it notifies the called party 111, 113. Notification messages are sent through the digital network(s) 109 to the user's workstation 114. Notification of the user is accomplished through a call control window 115 on the user's workstation 114 which "pops up" when a call arrives; a flashing icon which, when double-clicked, launches the popup call control window; a special sound from the workstation alerting the user to activate the call control window; any combination of these or other alerting mechanisms.

This notification is not the conventional telephone "ring" typically used by existing telephone systems. Instead, it uses the separate, independent and high-speed information path of the digital network(s) 109 from the call management computer 101 to a called party. In addition, notification conveys significantly greater information to the user and enables an entire array of new features and capabilities not previously available.

Figure 6A:
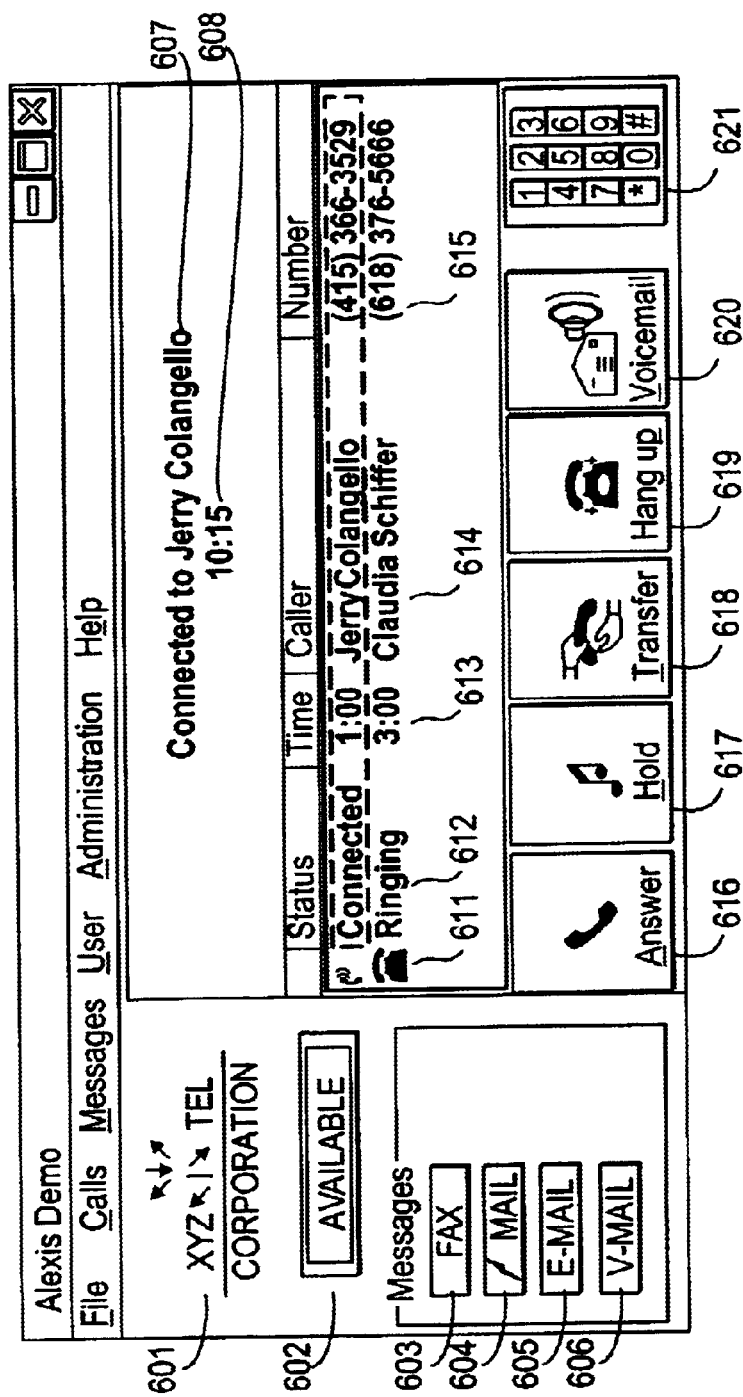
FIGS. 6a through 6e show components of the call management window as they appear at a workstation display.
Figure 6B:
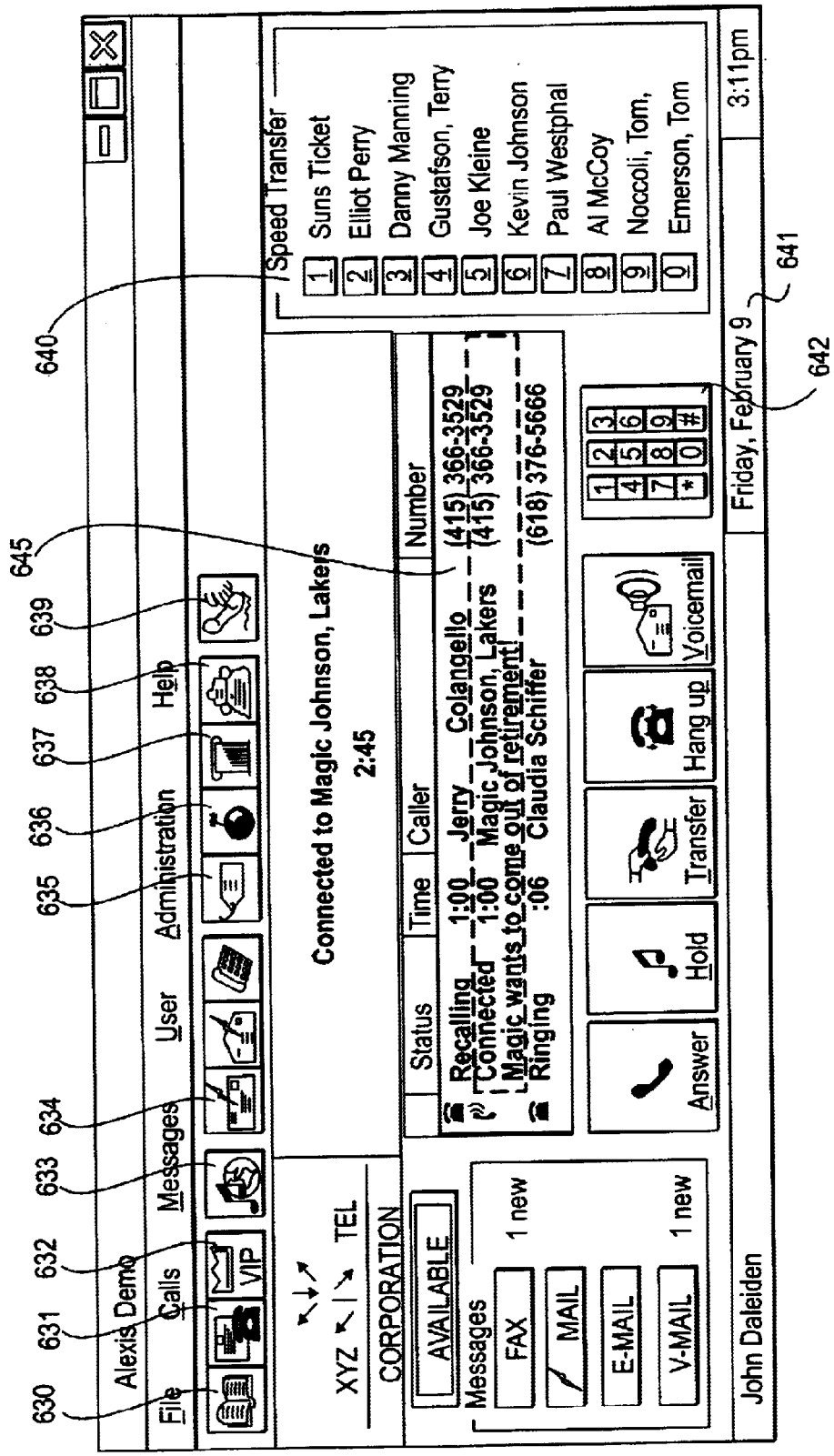

FIG. 6a shows a basic call management window 115 user screen, as seen when it pops to the front on the user's computer display due to any of the alert reasons listed above, or because the user activated it directly. FIG. 6b is a fully expanded user screen as might be configured by a "power" user providing more readily available functions, but in a more "busy" environment. The call management window FIGS. 6a and 6b supports a number of subsidiary windows through 6c–6e designed for specific purposes and described elsewhere.

The computer program behind the call management window is kept active at all times when the user is in any of the "available" states. It is designed to be consistent and compatible with Microsoft Windows and other appropriate conventions for its overall look and feel, menu conventions, buttons, borders, help, etc. A user can activate different features in a variety of ways including the following, all of which are referred to as "selecting"

1. clicking the primary mouse button on the selected button or item;
2. clicking on the associated menu, such as "Calls" and then clicking on the selected item;
3. double-clicking call notifications to transfer to that call;
4. clicking the secondary mouse button on a call notification to bring up a short menu of available options and then clicking on the selected one; or
5. typing in the associated keystrokes such as "Alt-A" for the "answer" button.

The main call management window 115 screen 6a is logically broken into the following areas:

8.2 Customer Logo

On the top left of the screen is the customer's or vendor's logo 601 as shown. The logo can be changed at any time by providing a new graphic file to replace the existing one.

8.3 User Status

The elongated button just below the logo is the user's status button 602 which the user may select to change his status to the system. User status includes:

1. "available to receive all calls";
2. "available only for VIP calls";
3. "unavailable—transfer calls to another location;
4. "unavailable—until 4:00".
5. "unavailable for all calls"

For the fourth listed status, when the time occurs, the status would automatically change back to "available".

The last listed status provides a list of options such as "Out to Lunch"; "In a meeting"; "On vacation"; "On a sales call"; "With a customer"; and others. Alternatively the user may type in or modify one of the standard options to provide more useful information for other users (see Section 17). Examples include "Out to lunch til 2:00"; "Giving a demo til 4:00"; "Out of the country til July 21, send everything to Judy"; and others.

8.4 The Message Board

Voice mail 606, along with Fax and data messages 603, e-mail 605 and "Flash" Notes 604 are "historical" messages, and are treated differently than "real-time" calls. For these historical messages, the user's call management window contains a "message board" area just below the user status button with an appropriate control button for each type of message 603–606. Whenever a message is available to be reviewed, e.g., a new Fax message, the Call Management System highlights the appropriate button name in flashing red and places a number adjacent to the button indicating the number of such new messages available to be reviewed. This procedure separates the various types of historical messages and substantially simplifies reviewing messages by users.

8.5 "FAX" Notification

When a user has received a new Fax transmission, the "FAX" button is highlighted and the count of new Faxes is provided. Selecting the "FAX" button launches the FAX selection subscreen. That screen shows the user's list of Faxes and summarizes the total number of Faxes, and identifies the number which are new messages (see Section 13).

The user may select one or more of the Faxes to be viewed or handled in other ways. Also, the user may select a checkbox to limit the display to only new Faxes. If the user selects a Fax to be viewed, the computer operating system's FAX viewer is launched with the name of the selected Fax file, popping the selected Fax up in front of the other windows.

8.6 "Flash" Mail Notification

Figure 6C:
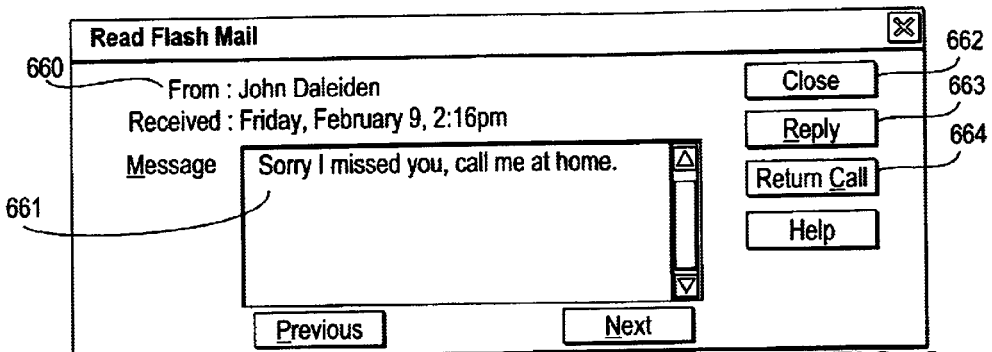
Figure 6D:
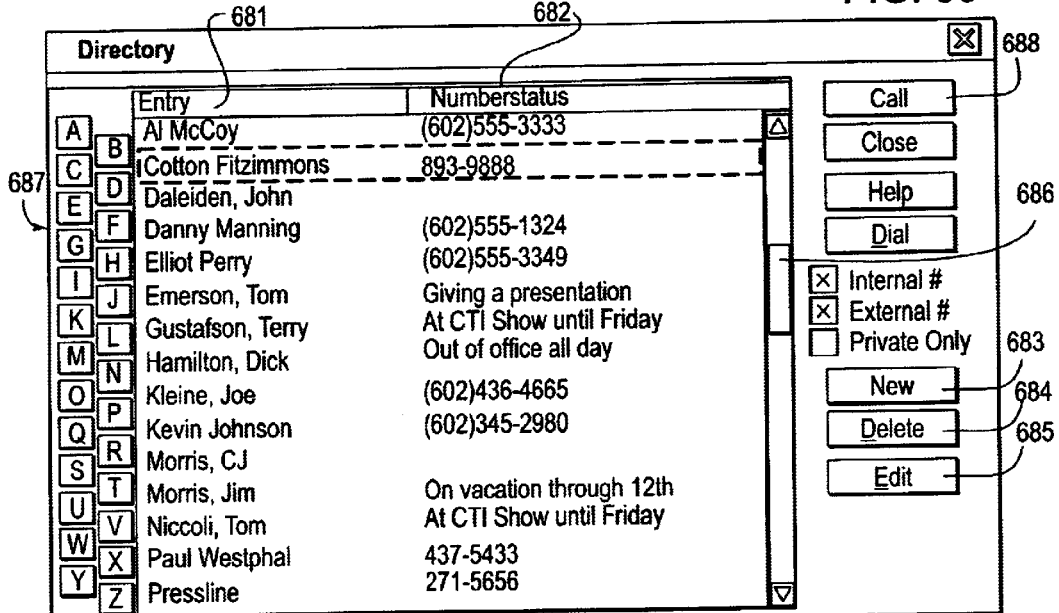

Flash Notes sometimes called "Flash" mail, are quick, simple messages which may be passed among system users. They are the equivalent of an "electronic shout across the office" intended as an improved, electronic version of the classical "pink slip" notes on which messages used to be written then carried to the intended party and presented to him. The user is notified of his unread flash notes by a highlighted "Flash" Notes button and an associated count of such unread notes. Selecting the "Flash" button allows the user to review his Flash Notes as shown in FIG. 6c. The Flash Notes screen indicates the originator 660 and the note itself 661, and allows the user to close it 662, reply to it with another Flash Note 663, or to return the call 664 by making a voice call to the originator. Flash notes can be sent to one or to many system users at a time, selecting multiple users for the note.

8.7 "e-mail" Notification

When a user receives a new e-mail message, the Call Management System is notified by e-mail services assuming the organization's digital network e-mail services provides this capability. The user is notified immediately of his unread e-mail by a highlighted "e-mail" button with associated count of unread e-mail messages. When the user selects his e-mail button, it launches the organization's e-mail client program, allowing the user to review and read his new e-mail messages. One special feature the Call Management System provides is the ability to record a voice message and attach that message to an e-mail message for later retrieval by the recipient. This feature is based on the capability of the organization's e-mail system.

8.8 "Voice-mail" Notification

When a user receives a new voice-mail message, the Call Management System is notified by voice-mail services, assuming the organization's voice-mail services provides this capability. The user is notified immediately of his new voice mail messages by a highlighted "voice mail" button with associated count of new voice mail messages. If the Call Management System includes an integrated voice mail subsystem, the voice mail messages may be retrieved in any order from the list provided. See Section 16 for a further description. Otherwise, the user accesses his voice mail messages serially via his telephone instrument, as is conventionally done.

8.9 User's Call Status

Near the top of the call management window 115, adjacent to the customer's logo, is provided the call status of the user 607, to whom he is currently connected, and the length of time the call has been connected 608 to the user. The length of time the call has been connected to the user is different than the length of time the call has existed as shown in the "time" field of the call alert box below. When the user has selected an "unavailable" status, the message on the screen is that selected or created status message.

8.10 Call Alert Box

The call alert box is immediately below the user's call status, and it displays all real-time call alert messages for the user to control his real-time calls. The components shown on the screen for each call include: "CALL STATUS ICON" 611 sometimes flashing or moving which indicates the status of each individual call; and a "CALL STATUS STATEMENT" 612 showing the individual status of each call. The call status statement may state that the status is "ringing", "connected", "holding" or "recalling". "Ringing" indicates the call has been received by the call management computer and processed, but has not yet been answered by the user. "Connected" indicates the call has been accepted by the user, put through by the call management computer 101, and is currently the "active" call. "Holding" indicates a call has been previously connected to the user and then placed on hold. "Recalling" indicates a call has been holding for longer than a predefined length of time, typically 60–120 seconds, but the call is still "holding".

Also displayed are the following: TIME 613 which is the time since the call was answered by the call management computer 101; CALLER 614 to identify the name and/or affiliation of the caller or "Unknown"; and NUMBER 615 to identify telephone number from which the call was made, when known, including: telephone numbers, "Internet" and other applicable identifiers.

"Source" identifies the source of the call as "outside", "inside", "Internet", or "other".

FOR "group" handling or employees who have temporarily moved to a "meeting" environment, described below, an additional field is displayed showing the initials of the called party.

This call information display occurs even while other calls for the same called party are in process, allowing the called party to know who is calling and to apply appropriate priority to each call.

When a call noted as "Unknown" is received, the called party may speak to the caller and determine who they are. The called party may choose to enter that person in the Primary Caller ID Database so that they are identified properly the next time they call; or have them speak their name for recording in the Voice Name Database for future calls; or simply type the caller's name and/or affiliation as part of the call information for use as the call is transferred to others in the organization.

In any case, the call information is corrected in view of the known identity of the caller.

8.11 Workstation Real-Time Call Controls and Management

A called party can control one call, or many concurrent calls, directly through a call control window 115 on a workstation 114. Section 1 describes the actions taken by the call management computer 101 and the relationships of the caller and called parties for many of the specific cases. This section describes the user's interactions, features and functions for call alert, control and management. A user can exercise call controls by any one or a combination of the following or other actions:

1. clicking the special call-control buttons shown just below the call alert window 616–620 ;
2. typing the letter underlined for each button or menu item, e.g., Alt-A for "answer";
3. opening and selecting from the "Calls" menu using the mouse or typed control letters Alt-C;
4. double-clicking the call to be answered see below;
5. secondary clicking the call to be handled to bring up a list of call commands, then choosing the desired command;
6. dragging and dropping a call alert onto a call function button; and
7. using the cursor keys to move among call alerts.

User controls may be exercised via the specialized call control buttons placed just below the call alert box, or call controls may be selectively activated from screen menus, or from the special "Button Bar" shown on FIG. 6*b*. These controls and management functions include:

1. ANSWER 616 answers the selected call. If another call was active at the time, it will be placed on "Hold" or "Hang Up" according to the user's selected options.
2. HOLD 617 places the call on hold, disabling both inbound and outbound voice paths, and starting the "recall" timer.
3. TRANSFER 618 transfers the caller to anywhere in the directory described below, inside or outside the organization, or to a typed in number anywhere in the organization or accessible via the PSTN (see Section 11). For calls transferred from secretaries or telephone receptionists providing "group" support, the default for transfer is the person to whom the call was originally intended. Also, when a call is active, the individual "Speed Dial" buttons or page of Speed Dial buttons (see "call origination" below) become different "Speed Transfer" buttons for single-click, rapid transfers.

Transfers can be directed to any entry in the directory (person, location, inside, outside, etc.). Transferred calls are identified to the transferred party with the initials of the transferring party as further information for call management. When transferring a call, the call can be "Tagged" with a digital message or it can be transferred with an appended voice message selected by the user from his drop-down list and played out at the time the call gets "Answered" by the transferee.

4. HANG UP 619 hangs up the call, releasing the caller and dismantling the caller's part of the call path.
5. VOICE MAIL 620 sends the caller to the user's voice mail box (see Section 16).
6. DIRECTORY 630 opens the directory for update or use (see below).
7. CALL LOG 631 opens the call log screen and displays the call log of the user's calls (see Section 14).
8. VIP RULES 632 opens the VIP rules screen for update (see Section 10).

9. GROUP HOLD 633 sends the selected call, not necessarily the active call, with any attached "Tag", to all members of the selected "specialty list" for servicing by the first available member, potentially including the user (see "specialty list" description below).
10. "FLASH" NOTE 634 creates a "Flash" note for sending to another user, as described above and in FIG. 6d. Flash notes can be sent to one or many system users at a time (selecting multiple users for the note).
11. TAG CALL 635 adds an electronic message to the selected call, not necessarily the active call, which will display on the user's call alert box and on any other system user's call alert box to whom the call is transferred or conferenced (see Section 12). An example of a "Tag" is shown in FIG. 6b attached to the second call 645 in the call alert box.
12. "BOMB" SELECTED CALLER 636 creates a VIP rule, or applies to the caller an existing VIP rule, which handles the current and all future calls from the selected caller, e.g., the "cold-calling broker", in a predetermined manner.
13. "VIP" SELECTED CALLER 637 creates a VIP rule, or applies to the caller an existing VIP rule, which elevates the selected caller to a specific VIP status, by providing distinctive ringing, follow-me routing, etc. (see Section 10).
14. "PIM" ACTIVATION 638 links to a selected Personal Information Manager or database with the information about the selected call, not necessarily the active call, in order to provide "Screen Pop" of the information associated with the caller. Note that if multiple PIMs or databases are used, a pull-down selection list is provided for the user to select the appropriate one to use for this specific call. This feature can be done either by clicking the "PIM" button or when the call is answered for automatic "Screen Pop" (a user preference).
15. MUTE 639 disables the outbound voice path, retaining the inbound voice path of the active call.
16. CONFERENCE CALLS conferences the selected call, not necessarily the active call, with the selected party or group of parties from the directory or as typed in by the user. This includes anyone internally, working at home, or external to the organization anywhere in the PSTN.
17. RECORD CALL records the active call for later playback and analysis.
18. PLAYBACK RECORDED CALL plays back a recorded call selected from the list of such calls in its own subscreen. Playback is done via a "Voice Pathway" created to the user's telephone system 106 or the "Data Path" transferring the voice message to the user's workstation to be played out via the workstation's voice capability.
19. MORE ID causes the call management computer 101 to play out a voice message from the Call Management Databases 215 asking the caller for additional information with which to identify him, including: entering a different telephone number or stating his name. Once done, the call is returned to the called party.
20. STATE CALLER'S NAME plays out the caller's name for the selected call, not necessarily the active call, as spoken by the caller during proactive caller identification or More ID interaction phases. The call management computer 101, 201 uses or creates a voice path to the called party and states the caller's name as spoken and recorded or uses the "Data Path" to transfer the voice message to the user's workstation to be played out via the workstation's voice capability.
21. PLAY MESSAGE selects a pre-recorded message from the pull-down list of messages and possible actions to be played out to the caller, e.g., "I am tied up at the moment and am transferring your to Sam", and an action to be taken after the message is played out, e.g., "Transfer call to Sam or return call to me, etc.". In effect, this is the creation of a temporary VIP rule for use with the highlighted call.
22. VIP RULES selects a VIP rule from a drop-down list to be applied to the highlighted call.
21. TRANSFER USER transfers the user from the current "available" state on this computer to the computer associated with the selected other user, and changes the current computer to the "Unavailable" status allowing the user to type in a reason for other users (see "meeting" environments described below).
22. USER PREFERENCES. The user may modify his screen and operational preferences at any time by selecting items from the "User" menu including a "Preferences" subscreen, allowing the user to change any of a series of his own operating characteristics including displaying the "Button Bar" 630–639 of FIG. 6b; displaying the user's "Speed Dial" buttons 640; displaying the call management window's "Status Bar" 641 showing the user's name, the current date and time; and when double-clicking a call alert, place the original active call, if any, on "Hold" or "Hangup".

User control messages resulting from user interactions with the call management window 115 and its subsidiary screens are returned, via the digital network(s) 109, to the call management computer 101 where they result in the requested actions being performed, and/or appropriate interactions with the Call Management Databases 215.

8.12 "Directory" Support

One important aspect of the Call Management System is support for the "Directory", both corporate and personal. The directory user access shown in FIG. 6d contains:
1. ENTRY 681. The name/affiliation of a person or organization including employees, voice mail, places, e.g., "conference room", outsider.
2. NUMBER/STATUS 682. The received telephone number or status of the entrant, including local numbers without area codes; long distance numbers with area codes; international numbers with country codes, city codes, etc.; Internet access; status for system users; and other.
3. RETURN TELEPHONE NUMBER The telephone number to call that person, if different from above.
4. VIP STATUS defines this person as having VIP status.

The user maintains the directory through subscreens to add "New" 683 entries, to "Delete" 684 an existing entry or to "Edit" 685 a selected entry. The user may define an entry as "Corporate", available to all users, "Group", available to users specified as part of a specified "group", and "Private", available only to the user himself.

When the directory is opened, the user may select how it is sorted, limited, and displayed, including internal entries only, external entries only, private entries only, sorted by name, sorted by affiliation, sorted by number, limited to area codes, or ranges of names, and others.

Access to entries is conveniently available by scrolling the sidebar 686 using the mouse, scrolling down or up the entries using the cursor keys, clicking letter buttons 687 to jump to the start of names beginning with that combination of letters—after a limited time, three seconds or so, the list is cleared and the user may start again. As the user types the name, each letter entered causes the list to jump forward to the first of the names beginning with the list of characters entered. Once a match has been made, the user can key "Enter" or click "Call" to originate a call to that number, or the user configuration can be set so that the number is automatically dialed as soon as a match is made. After a limited time, three seconds or so, the list is cleared and the user may start again; and others.

The directory is used throughout the call management window 115 functions for routing calls VIP rules, originating calls 688, reviewing user status, transferring and conferencing calls, sending "Flash" notes, and many other things.

While the directory is a part of the Call Management Databases 215, it is used in a wide variety of ways and with entry sorting and display as appropriate to each.

8.13 Call Origination

The Call Management System provides flexibility and user convenience for "originating" calls, in addition to its features and functions for handling "incoming" calls. The user may originate a call at any time, even while other calls are active or waiting, by opening the "Directory" described above, selecting an entry and clicking "Call" or pressing "Enter" as described above; opening the directory described above, typing a name, and having the system automatically begin dialing when a unique match has been found or waiting until the user clicks the "Call" button as selected for each user; clicking "SpeedDial" buttons 640 defined uniquely for each individual from the "directory". Multiple pages of SpeedDial buttons are provided for users requiring rapid access to a large number of dialable numbers; or activating the "Dialpad" button 642 to bring up the dialpad subscreen; utilize the Secondary Caller ID database to find a number and/or name, then outdial it.

Figure 6E:
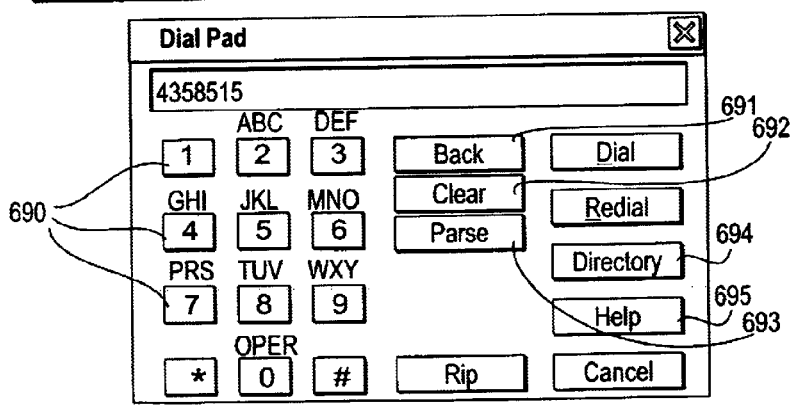

The "Dialpad" subscreen, shown in FIG. 6e, includes a representation of the telephone dialpad with the numbers 0–9, # and * 690. Calls may be originated by any of the following:

1. Clicking on the dialpad buttons to enter a dialable number then clicking on the "Dial" button. Note that the "flip" button allows the user to "flip" the dialpad so that it matches an adding machine keypad rather than a telephone keypad. Once entered, numbers may be removed one by one by the "Back" button 691, or cleared altogether 692. "Pause" 693 codes may be entered for use with modems, dialers, etc.
2. Typing in a number from. he keyboard and then the "Enter" keyboard key.
3. Clicking the "Redial" button 694 then selecting any one of the last five called numbers shown.
4. Activating the "Directory" 695 and choosing an entry to be called.
5. Typing in a name from the directory and having the system dial that person when a match is made.

When outdialing a number, the Call Management System provides the ability to "Redial" repeatedly until the call gets through an otherwise busy line.

When no call alerts are present and no user calls pending, the call management window 115 shows a "Recall" button and a "Directory" button in place of the specialized call control buttons below the call alert box. Clicking them brings up the "recall list" or the "Directory list" as described above, simplifying call origination.

8.14 "Outside" Employee Support

The Call Management System supports "Outside" employees who are rarely or never in the office and who have no workstation.

Such "Outside" employees are given "pseudo" numbers for which no actual workstation or telephone extension exists, which may be used by callers. The "Pseudo" user establishes his own VIP rules which automatically handle all his calls, including his own voice messages, for selected callers and re-routing of his calls to other users.

Thus, the "Outside" person is supported, just like other system users, with callers being unaware that person is not in the same location.

8.15 "Group Secretary" Support for Calls to Specified Groups of Employees

The destination party for calls does not have to be the actual called party. The Call Management System provides for a specific user to handle calls for a select "group" of others, system users or not. This "group" handling mode is intended for a secretary or telephone receptionist handling a group of executives or others, and for an organization's telephone operator. In either case, the specified user is expected to receive calls, prioritize them appropriately, respond to each accordingly, attach "call tags" and transfer calls as needed, thus effectively screening calls for the specified group.

The basic difference between direct notification of a system user and notification of the "group secretary" receiving calls for the individual, is that the call information displayed on the call management window is expanded to include the initials or other identification of the actual called party, allowing the secretary to know to whom the call was destined, and handle each call as appropriate. This capability requires appropriate information in the call management databases, identifying the group of people, the secretary to answer the calls, the initials or other identification for the called parties and other control information. On a dynamic basis, system users can be added to or removed from "Group Secretary" mode by those assigned "Secretary" status, allowing for the cases where a user runs by the secretary on his way out saying "I have to go, please handle my calls".

8.16 "Meeting" Support for Users Away from Their Workstation System

Users typically use their own workstation computer for most of their activities, but occasionally users need to leave their workstation and move to another location for a meeting or otherwise. Users can move to another location and, using the call management window on the computer where they are currently active and logged in, they may log off and choose an appropriate "unavailable" state, or select the "TRANSFER USER" function and move to the new site. Once there, they may log on to the call control window of the computer at that site, along with others who may be sharing the meeting site, or the person whose computer is at that site. When this happens, a temporary "group" definition is created and the users who are at that site sharing the site's computer, are treated as described above, with their call notifications sent to the site's computer as though a secretary or operator were screening the calls even though the individuals may be managing their calls themselves.

This procedure allows users to hold meetings in offices or conference rooms while continuing to receive and handle their calls as appropriate.

Users who attend meetings outside the office may create the same capabilities by using their portable or other computer at the outside meeting site, calling into the Call Management System via Internet or otherwise, and providing the telephone number for the meeting site. With this, one or more users can continue to receive and handle callers as though they were in the office.

8.17 "Specialty-List" Support for Special User Groups

The Call Management System provides the ability to define multiple "Specialty lists" of users who work together or have certain affinities, e.g., sales, accounting, customer service, manufacturing, etc. These groups represent arrays of users who can receive and handle certain kinds of calls, such as sales calls, customer service calls, etc. Each such special group is assigned a pseudo extension number through which it may be reached. The purpose of these "specialty lists" is to provide a new means for rapidly getting calls to the first available member of the group able to take the call.

When a call is made directly to the pseudo number or, a call is transferred to the number, the call management computer 101 concurrently alerts all of the users in the group by sending alert messages down the digital network(s) 109 to their workstations 114 and thence to their call management windows 115. The first person in the group to "answer" the call causes the call management computer to connect the call to the answering party and to remove the call notification from the call management windows of the other members of the group.

Specialty List Handling is a means to provide rapid access to the desired function within an organization, without having to go through an operator as is otherwise customary.

8.18 Feature Activation

These many features can be turned on individually for each user, maximizing the effectiveness of the organization's training and call management.

8.19 TAPI Client

The workstation software also provides a TAPI client for other applications which need to outdial or receive calls, e.g., this feature means a PIM can place a TAPI call to have a number automatically dialed.

8.20 Automatic Updating

The Call Management System automatically updates the user's workstation software from the call management computer whenever changes are needed. This is invisible to the user and is handled automatically at user logon time.

9. Multiple Call Handling Using a Single Extension

The Call Management System allows each user to be aware of and to manage multiple calls at the same time, using a single extension number, and using a simple POTS telephone instead of the customary expensive, multi-button, proprietary telephone instruments 106. By using the digital network(s) 109, workstation computer 114 and call control window 115 for communications with the called party 111, 113, the Call Management System is freed from the conventional limits on when, how and how much information can be communicated to the called party and likewise, when how and how much control can be exercised by the called party.

The Call Management System presents multiple calls, as they arrive and are identified, (Sections 6 and 7) to the called party 111, 113 using the call management window 115. Multiple calls are identified to the user through call alert information which is displayed in the call alert box of the call management window (see Section 8). The called party, applying his own preference, may then deal with each call as most appropriate. Calls can be: answered, placed on hold, sent to voice mail, transferred to an individual or "group list", recorded, hung up or any of many other appropriate actions. All of these capabilities are under the control of the called party, and all can be exercised for any of the calls, thereby giving the user complete freedom to manage their calls as best fits their ever-changing priorities, e.g. switching from a cold-calling broker to an important customer.

The called party can effectively interact with multiple callers concurrently by rapidly "switching back-and-forth" as needed among calls. The called party simply double-clicks a call, other than the one that is currently active, and the call control window 115 causes a message to be sent down the high-speed digital network(s) 109 to the call management computer 101 which instructs the circuit switches 204 to transfer the voice path of the new call to the re-usable voice pathway 121, 221 to the called party and leave the previous connected call on hold or hang it up as defined by the called party for their own specific configuration. In this way, the called party can "bounce back-and-forth" rapidly among many calls, servicing them as priority dictates. This capability is in sharp contrast to the time-consuming creation and tearing down of entire connections each time, as required by conventional PBX and other switch systems 104.

Thus, handling multiple calls at the same is simply, logically and rapidly controlled by the called party, using the computer's mouse or keyboard while repeatedly reusing the existing voice path.

10. User-Defined VIP Call Handling

VIP call handling is an automated adjunct to or an alternative for the call control window 115 notification of the called party 111, 113 and corresponding workstation control commands. With VIP call handling, specific callers, groups of callers or all callers are given unique treatment based on "VIP rules" defined by the organization and/or individually by the user. Call management window 115 "VIP Rule" subscreens allow the user to manage their own VIP rules. The VIP rule subscreens of the current implementation are shown in FIGS. 7a–7c. As with the other aspects of the user interface, this is but one potential configuration of buttons, selections and controls which can be configured to allow the user to create and manage his VIP rules. VIP call handling rules for each user are maintained by the call management computer 101, 201 as part of the call management databases 215 and are dynamically changeable by and for each user, except for corporate-wide rules. Changes to the rules can be made through the user's VIP Rule subscreens of the call management window 115 on their workstation 114, through the user's laptop or other remote computer attaching through a digital network or through the user calling and changing characteristics through direct telephone entry.

VIP handling for special callers, customers, etc., is a major improvement in the efficiency and effectiveness of call handling for organizations. VIP rules allow each user to tailor how callers are handled and routed, and are especially effective for "follow-me" routing in which an important caller, or group of callers, can be assigned to a rule which specifies that: when you are out of the office to call automatically to your cellular, car or other phone. Later, the user can call and change the rule to route calls to a different phone number. Additional features include, "find-me" capability where the user can have several numbers automatically dialed, such as car, cellular, home, etc. to find the called party for direct connection to the caller.

The basic VIP Rule subscreens consist of a list of existing VIP rules which may be selected 701; the ability to activate an additional subscreen to "Add" 702 another rule; the ability to "Delete" 703 the selected rule; the ability to "Copy" 704 a rule for later change; and the ability to make each rule currently "Active" or "Not Active" 705.

Figure 7:
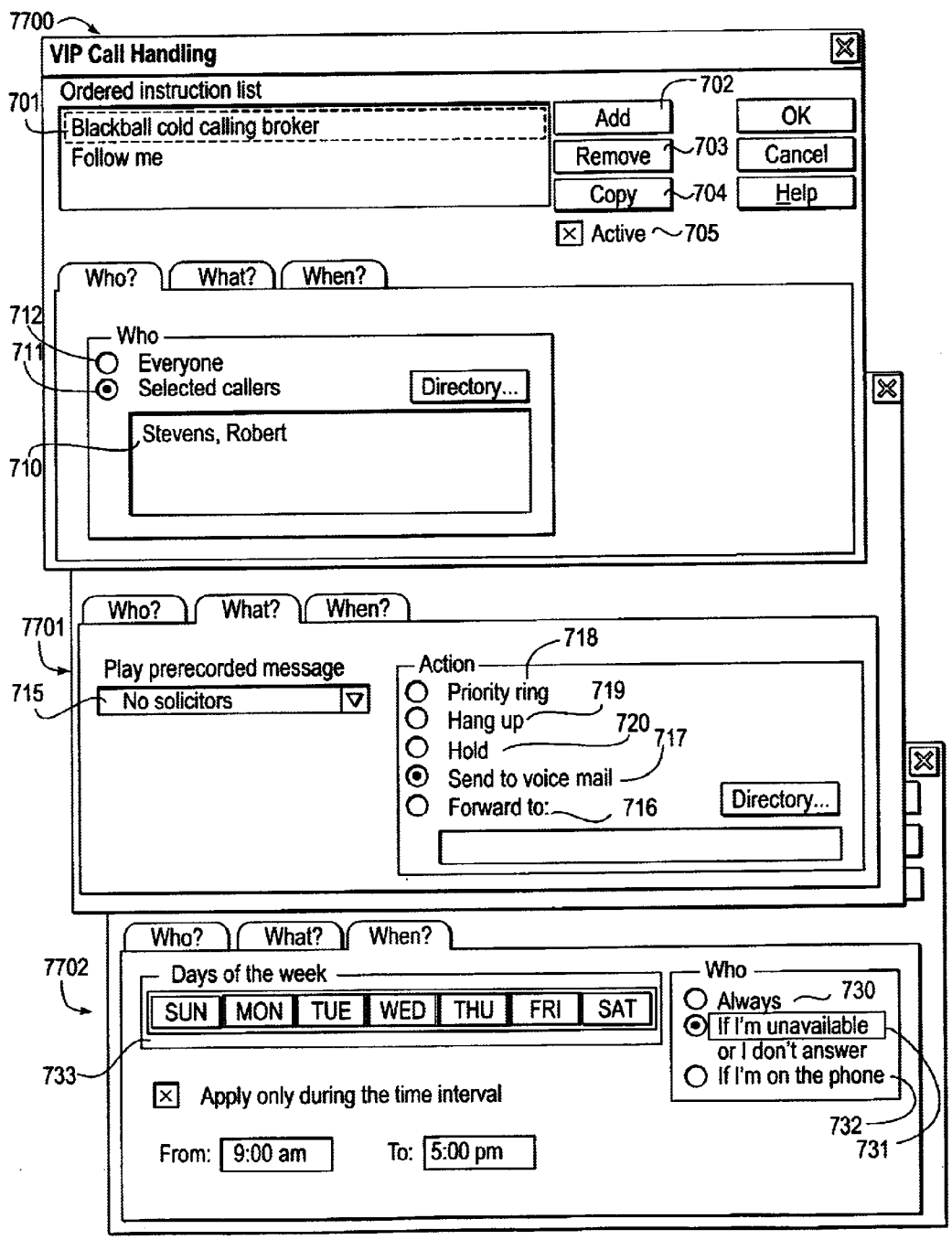
FIG. 7 shows components of call management windows for VIP rule creation and management.

Each VIP Rule contains three parts to define who the rule applies to, what action is to be taken, and when the rule applies. FIG. 7 illustrates the three displays for the who, what, when parts of the VIP rules.

Screen 7700 is used to define "WHO" does the rule apply to. The rule will apply to the caller that is highlighted on the display. The rule applies to specific individual callers 710 whether included in the "Directory" or just typed in; selected callers 711 from the directory and/or typed in to whom the rule will be applied; or everyone who calls 712, typically for use when the caller is "unavailable".

Individual callers or groups of callers can be included in multiple VIP Rules, allowing the user to specify different handling under differing conditions.

The Call Management System provides for multiple greetings messages to be played out to defined groups of callers based upon their calling numbers, e.g., all callers from New York area codes get one message and then get transferred to Sam. This provides special treatment for callers from different locations.

Screen 7701 is used to define "WHAT" actions are to be taken. VIP rules can result in one or a series of actions to be taken:

1. Play out selected prerecorded messages 715 to the caller, personalized for the caller and recorded in the called party's own voice, e.g., "John, I'm out of the office today. If you need to speak with sales, press one, or to speak to Sam, press two. Otherwise, I will call you back tomorrow." Or "John, I'm on the phone right now, but don't hang up, I'll be right with you.".

These messages can also be used for "Callback" responses to important persons, e.g., "Mark, I got your FAX and have found the shipping date is December 12. Let me know if I can help you further."

Creating new messages is done by selecting "New" from the list of prerecorded messages, whereupon, the call management computer 101, 201 will establish a voice pathway 121, 221 to the user's telephone instrument 106 and the user will record the message. When completed, the user will name the message, edit it as needed and then have it available for the VIP rule being created or modified.

Special "Menu" messages can be created, e.g. "To speak with Tom press 1, to speak with Sam, press 2, to speak to my secretary press 3 or to speak to the operator press 0".

2. Receive information entered by the caller via the telephone keypad, spoken or by other means.
3. Process the entered information, re-routing the call to one of a series of other numbers based upon the entered information, e.g., "2" to reach Sam.
4. Use the entered information as a "Tag" to the call (see Section 12).
5. Activate another VIP rule based on information input by the caller.
6. "Forward" 716 the call to another destination anywhere inside or outside the organization as typed in or selected from the directory.
7. Transfer the caller to voice mail 717 whenever he calls.
8. "Return to me" when the transferred call is complete.
9. "Follow-me" routing for certain callers allows the user to specify one or a series of numbers to be used to reach the user when the specified caller calls. The user switches from one number to the next by calling his own extension and entering telephone keypad numbers to change from one number to another, e.g. car phone, home phone, cellular.
10. "Find-me", "Chase me" routing for certain callers allows the user to instruct the Call Management System to call a series of different numbers simultaneously, attempting to locate the user. When found through voice entry or information entered via the telephone keypad or otherwise, the caller is switched automatically to that number, e.g., home, car phone, cellular, etc.
11. "Page me" or "Beep me" instructs the system to place a call to the specified beeper service and page the user. It also includes transmitting the caller's name and telephone number for display on the user's beeper, where that service is available. This is useful for both real-time calls which are not completed because the user is "unavailable" and for when calls are sent to voice mail. One variation of the "Page me" approach allows the caller to stay on the line while the page is made and then, when the caller calls his own "One Number" and identifies himself, to connect the two calls together.
12. Provide "Priority Ringing" 718, a special sound when this caller calls to alert the user to a VIP caller.
13. "Hang Up" 719 when this caller calls.
14. Place the caller on "Hold" 720 whenever he calls.

Screen 7702 is used to select "WHEN" the rule applies. The following selections may be made for "When":

1. For certain status of the called party: always 730 unavailable for calls or not answering 731 available but on the phone 732 available for VIP calls only, etc.
2. Within defined days of the week 733.
3. Within specified times of the day.

Certain VIP rules are pre-defined and merely have callers added to them. These include:

1. "Bomb" the caller and send all his calls to user's voice mail.
2. "VIP" the caller, giving him special ringing and notices.
3. "Follow Me" having the system follow the user.
4. "Find Me" having the system find the user.
5. "Page Me" having the system page the user.
6. Others.

10.1 Temporary VIP Rule Usage

The user may highlight a call in his call alert box and then select a rule from a drop-down list for immediate application to that call, even though the caller does not normally have that rule applied to him. The user may also create a temporary rule (play out a message and specify a following action) for handling a highlighted call.

The Call Management System further enhances the user's ability to handle his important callers by providing the ability for the user, when out of the office, to call to the system and record new voice messages and/or change selections for his VIP rules via entries from his telephone keypad voice recognition or otherwise.

10.2 Advanced Message Notification

The user may establish a set of rules that specify how the user is to be notified of various types of messages. For example, the user could set up a rule like, "If I receive an e-mail message from Victor between 5 AM and 7 AM, call me at my car phone; if I don't answer, page me." Another example might be, "If I receive a Fax from anyone at Motorola, forward a copy to my home Fax machine." One of the Call Management System's primary capabilities is to function as a central repository for message notifications, where the user has complete control over the notification mechanisms.

11. Routing Calls Inside or Outside to the Organization

Unlike existing PBX or other telephone switching systems, the Call Management System routes calls internally within the organization or externally anywhere in the PSTN. Thus, calls can be transferred by a called party, or via VIP rules, anywhere the telephone network reaches. This is a major departure from the conventional telephone switch capability, which is customarily limited to intra-organization routing only.

When a call is received by the call management computer 101, the calling party, called party, and call type are used to determine the needed action. For voice calls, the called party may be alerted, receive the call and transfer it to a specified number or VIP rules may specify transfer to another number. It matters not that the number specified is within the organization or external to it. In either case, the call management computer transfers the call as specified.

For internal calls, the call management computer establishes a voice pathway 121 to a destination extension, e.g., user 111, and alerts the called party if that destination applies to a system user. For destinations outside the organization, an available outgoing CO trunk circuit 102 is seized or a two-way circuit is negotiated through which a voice pathway is established and the call path transferred.

Calls utilizing Internet voice capabilities are placed through the Voice-over-Internet interface.

The ability to route calls anywhere, not just within the organization, is a major improvement in efficiency for the organization.

12. "Call Tags"

The Call Management System provides a mechanism whereby system users can "tag" calls with digital messages, which then remain with the call, but can be modified so long as the call exists, no matter to which system user it may be transferred. Call tags are a unique ability, available only because of call management via the user's workstation computer for which digital information is conventional, unlike telephone instruments with their lack of or minimal display capabilities. These digital call tags provide an advanced and convenient means for one user to provide useful information to other users, within the organization, about the needs or interests of the caller, or anything else that may be appropriate, e.g., "Sam needs to know about system installation" or "John has a question re: pricing".

A system user may "tag" any call showing in the call alert box of his call management window 115 with or without his answering the call, thus creating a digital message which, along with the initials of the tagging party, immediately appears attached to the call alert line. As that call is transferred to or conferenced with one or more other system users, the notification and attached call tag moves with it, always displaying along with the call alert line. Any receiving system user can modify, expand or even erase the call tag message, as appropriate.

"Special Tags" can also be added to a call which provide for return of the call when completed by the transferee; return of the call if not taken by the transferee; transfer of the call to another destination when done; or others.

Call tagging is an electronic tool similar to the old-fashioned "pink slip" notes of paper which were used to pass messages within an organization. However, call tagging is a significant improvement, since it is digital, automatic and, specifically, ties the call tag message to the call itself. Call tagging is a powerful new means to improve efficiency and information flow within an organization.

13. Facsimile Fax and Data Calls

The Call Management System converts every system user's telephone extension into a never busy FAX gateway, with automatic detection and reception of incoming Fax messages, and confidential delivery to the recipient's desktop computer. No Fax hardware need be added at the desktop, and no special Fax telephone lines or numbers are required to receive Faxes, Faxes or data transmissions are simply sent to the user's "One Number" unique personal point-of-contact extension. The system detects and automatically receives each Fax or data transmission and electronically delivered it to the user's desktop machine, without his extension ever ringing or interfering with normal voice traffic (private, paperless, immediate delivery of electronic transmissions.

Notification of received Faxes or data files is via the desktop computer, similar to e-mail, and is also given by the system (in voice) when the user calls in to retrieve his voice mail. Outbound Faxes may be composed in the desktop machine and passed to the system for private, paperless, immediate transmission to the recipient(s).

These features improve the efficiency, confidentiality, security and punctuality of Fax and data delivery and transmission within the organization.

13.1 Receiving Fax and Data Transmissions

During all calls, assigned DSPs continue to search for Fax or data signals which, if encountered, immediately switch control to the appropriate Fax or data mode protocols. Thus, even during a voice call, the caller may switch to Fax "Send" mode, causing a CNG or other appropriate signal to be sent. The assigned DSP 208 receives the signal, alerts the call management computer 101 and the assigned DSP is then switched to a Fax protocol mode to complete the transmission.

The call management computer 101 identifies an incoming call as a Fax or data call type because the system received a CNG or other signal for Fax or an appropriate DTMF or other signal for data or a "reverse" modem courier signal. If the fax or data call was dialed directly to a system user's extension number or the caller used the call attendant feature to identify the called party, the call management computer 101 instructs the attached DSP processor 108 to receive the fax transmissions automatically using a standard Fax protocol with adjunct file transmission capabilities. For data transmissions, the DSP is instructed to use an appropriate data protocol Fax plus data, X.34, ISDN, TCP/IP or other. Even during a voice call, the caller may switch to Fax mode, causing a CNG or other appropriate signal to be sent, identified by the assigned DSP 208 and the DSPs to be switched by the call management computer 101, 201 to Fax protocol mode to receive the transmission.

Because the Call Management System knows who is receiving each Fax, it applies a unique Fax identification for each user uniquely identifying the receiver to the Fax sender.

When a transmission is received, Fax, file, video, etc., it is stored on the call management computer's database 215 or on the organization's digital network(s) message storage facility. The destination party 111, 113 is then notified of the new Fax or data through messages sent by the call management computer 101 down the digital network(s) 109 to the user's workstation 114 and finally to the user's call management window 115 (as described in Section 8).

When notified, the destination party 111, 113 may review the list of unread Fax or data messages and then may request that the Fax or data message be transported to their workstation 114 via the digital network(s) 109, from whence it can be viewed, printed, archived and treated as any other such file (see below).

The result is that each system user is provided with private, paperless, and immediate Fax and data send and receive capabilities without having to add any hardware to their desktop computer 114.

This use of a "One Number" direct user access with automated reception of Fax and data messages is a significant improvement over other approaches, which typically require: a dedicated Fax/data line and hardware for each person's desktop computer 114 doubling the number of CO circuits in use, or having all Fax and data messages routed to a designated person for later sorting out and distribution, thereby delaying delivery and losing privacy, or assigning a separate block of telephone numbers attached to a special fax/data transmission server.

13.2 "FAX" Notification.

Figure 8:
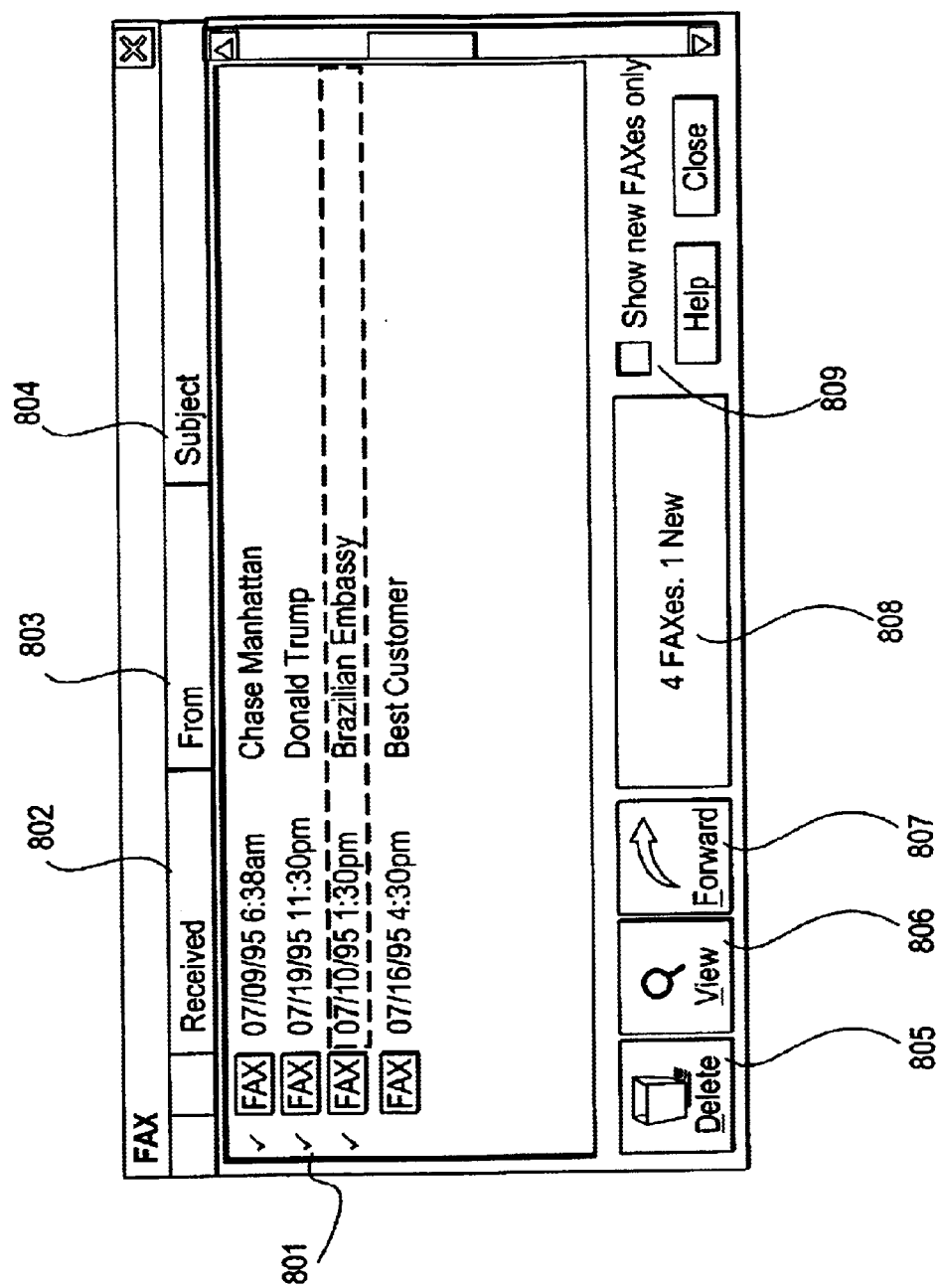
FIG. 8 shows a Fax handling display.

When the user has received a new Fax transmission, the, call management window's 115 "FAX" button is highlighted and the count of new Faxes is provided. Selecting the "FAX" button launches the FAX selection subscreen FIG. 8 of the current implementation. That screen shows the user's list of Faxes and summarizes the total number of Faxes and the number which are new 800. The list includes:

1. "Check" 801 if the Fax has been previously seen;
2. The date and time received 802;
3. From whom the Fax originated 803;
4. Subject of the Fax 804 for future reference;
5. "Print" the Fax document;
6. "Send" copy or original Fax documents to someone else from the directory or typed in with attached "Annotation" voice or digital message and name of the original recipient;
7. "Broadcast" Fax document to selected people/locations form the directory or typed in with attached "Annotation" voice or digital message and name of original recipient. Broadcast of Fax documents includes selection of dates, times, retries, etc.;
8. "Routing" one or more Fax documents to the system users assigned to the routing list with attached "Annotation" voice or digital message and name of recipient.

The user may select one or more of the Faxes to be viewed 806, deleted 805 or forwarded 807. Also, the user may select a checkbox to limit the display to only new Faxes 809. If the user selects a Fax to be viewed, the computer operating system's FAX viewer is launched with the name of the Fax file, popping up the selected Fax in front of the other windows. Voice or digital "Annotation" by the system user is provided in the same way that voice messages are recorded for VIP rules.

13.3 Unique Call Routing for Faxes or Data

Fax or data transmissions, received for specified numbers such as the organization's base number, may be accepted for a specified user, e.g., the organization's operator who sorts them out and sends them to the appropriate users, prints them and deals with them conventionally, or sends them directly to a Fax machine or computer for data prefacing.

13.4 Special Data Calls

For special kinds of data calls, e.g., video conferencing, the Call Management System transfers the call automatically to an appropriate extension for handling by a specialized device.

13.5 Laptop Data Calls

The Call Management System provides for users to call into their "One Number" with their laptop computer and, after being identified to have access to their desktop computers for file transfers and maintenance as well as to have access to their e-mail and other electronic messages. The user also has access to their Call Management System functions (VIP rules, status, etc.) in order to change and update them as appropriate.

13.6 Outgoing Fax and Data Transmissions

Fax and data transmission of documents/files created at the desktop computer 114 is also provided through conventional "printing" to the fax/data feature of the call management computer, from whence the document can be transmitted automatically immediately, or at specified times, to one or more recipients in the Call Management System directory or to numbers typed in by the user and with specified retry attempts.

Because the Call Management System knows who is sending each Fax, it applies a unique Fax banner for each user specifically identifying the sender to the Fax receiver.

13.7 Retrieving Fax or Data Files Via "One-Call" Message Retrieval

The Call Management System also addresses the special needs of the traveling or at-home user. Using any touch-tone telephone, the user retrieves his voice mail messages from the enterprise's existing voice mail system and, in the same call, is notified by system of the existence of his unread Fax, data and e-mail messages. He can then instruct the system to Fax these messages to a convenient Fax machine near him, e.g., a hotel, airport or home Fax, or to transmit them to his home or laptop computer (see Section 15).

14. User-Accessible Call Logs

All calls received by or sent from the Call Management System are summarized in a user-accessible call log as part of the overall call management database. This allows users dynamic access on demand to the call logs, and enables the ability to return missed calls with only the click of a mouse. The use of a user-accessible call log improves the ability for system users to be aware of who called, to get back to callers missed and to monitor their telephone usage. Management of the organization may also use the call log database to monitor responsiveness to returning calls and misuse of business telephones.

All calls received or placed by the Call Management System are summarized in the Call Log portion of the call management database. Each user has direct access to his own call log containing all his calls, even if the caller chooses not to leave a voice mail message. Using this call log, the user may simply double-click to return missed calls, with the system automatically outdialing them.

Figure 9B:
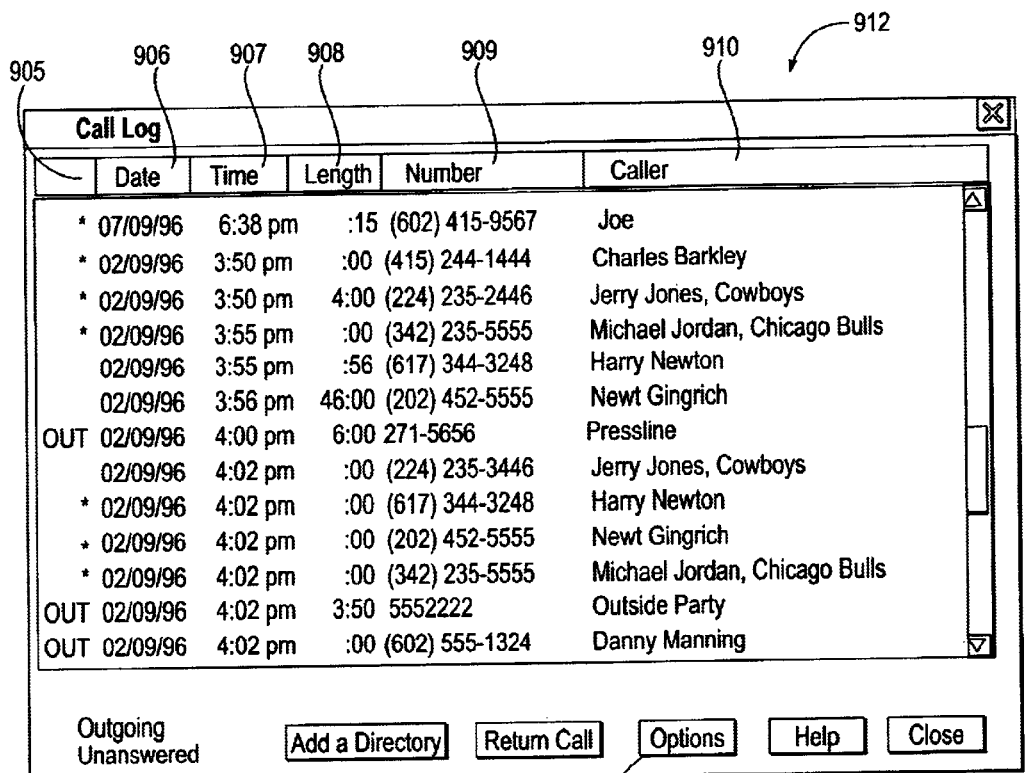
FIGS. 9a and 9b show components of call management windows.
Figure 9A:
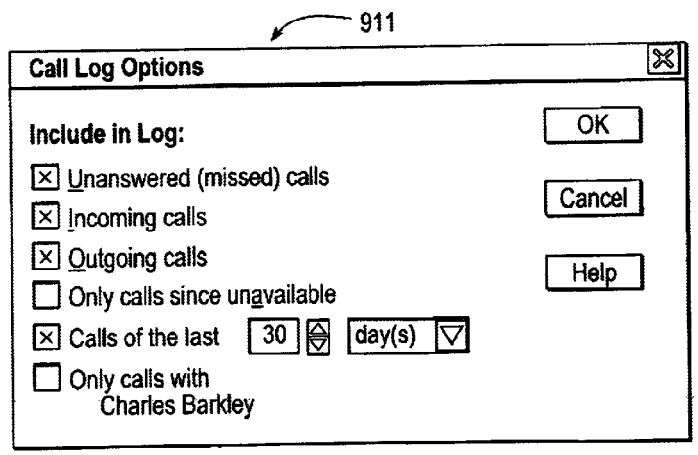

Each user is provided a complete log of his own voice calls, available on demand, through subscreens of his call management window 115, as shown in FIG. 9a and with log sorting options in 9b. As with all other aspects of the user's graphical interface, different screens, buttons, wordings, etc. can be used as the means to accomplish the same ends. The current implementation as shown is but one of many possible arrangements.

Each log entry includes the following fields:

1. CALL INDICATOR 905
    "Blank" for incoming calls
    "Red Dot" for missed calls sent to voice mail without answering, transferred without answering, etc.
    "Out" for outdialed calls
    "VM" for calls sent to voice mail
    Others.
2. DATE 906 Date the call occurred
3. TIME 907 Time the call began
4. LENGTH 908 Duration of the call HH:MM
5. NUMBER 909 Telephone number from which the call originated
6. CALLER 910 Name and/or affiliation of the caller or called party.
7. "TAG" Associated "Tag" message and initials of the "Tagger".

8. TRANSFERRED TO Number or name of transferred party for transferred calls.
9. CALLBACKS Count of times a callback was attempted and the date/time when the callback was successful.

This directory is retained as a user-accessible part of the Call Management Databases 215 and can be accessed at any time through the user's call management window 115. When opened, the user can click the "Options" button 911 to bring up the "Options" subscreen 912 shown in FIG. 9*b*. The user can define how his log is to be sorted by picking and choosing among the various options as shown, including only unanswered missed calls; incoming calls, outgoing calls, only new calls since the user last was available, calls only within the last number of days, weeks, months, etc., and others.

If a call is active at the time the call log is accessed, the calls are sorted and limited to those to/from the caller of the active call, allowing the user to know when calls occurred between himself and the caller.

Whenever the call log is accessed, any call shown can be "double-clicked" by the user to tell the system to outdial the caller immediately. This allows users to keep track of their missed calls and to return calls quickly, e.g. after returning from lunch, even if the caller failed to leave a voice mail message.

Even though each user is limited to viewing only his own log entries, the system manager may have the logs of all employees sorted, combined, processed and printed in any way management requires using the industry-standard database tools as an added means for managing the business. For example, it may desirable to know how long on the average it takes for a customer to get a call back, or whether certain employees are misusing corporate telephone resources for personal purposes.

Additionally, these call logs provide the means for corporate management to do accounting comparisons with central office bills, verifying accuracy and completeness and often saving telephone costs. The logs can also be sorted and compiled to show traffic flow for workplace maximization.

15. "One-Call" Message Retrieval

The Call Management System permits for traveling or out-of-the-office employees to make a single telephone call to receive all of their electronic messages, whether voice mail, Fax messages, data files or e-mail. This feature is a significant improvement over the usual requirement to make several calls, using different technologies to retrieve messages in different forms. Retrieving all of the user's electronic messages during a single telephone call is a major improvement, especially from remote locations where telephone call connections are difficult, unreliable or can take a long time to establish, and re-establish.

One-Call Message retrieval is accomplished by the traveling system user placing a call to the organization's voice mail 116, as is done conventionally by calling the voice mail retrieval number. The call management computer 101 recognizes the destination number as that of voice mail retrieval and puts the call directly through but remains online with the attached DSP 208 assigned to identify the caller's mailbox number, as entered through the telephone keypad or by voice. With the voice mailbox number, the call management computer 101 identifies the caller 118 through correlating voice mailbox numbers in the call management database 215.

The Call Management System then identifies the caller as a system user and checks to determine if any new Fax or data messages are stored in the call management database, and determines if any new e-mail messages for the caller exist, assuming the e-mail system can report such information. If any of these electronic messages exist, the Call Management System plays an unobtrusive chime for the caller to hear saying, in effect, "you have electronic messages in other forms waiting for you, don't just hang up." The user then knows to logoff from the voice mail system 116 when he is finished.

When the assigned DSP 208 detects the user's entry of a voice mail's logoff sequence, it informs the call management computer 101 which then instructs the DSP to play out a message from the Call Management Database 215, e.g. "You have two new Faxes and three new e-mail messages, press one for immediate delivery." If the caller responds as requested, the caller may then be asked for and respond with an additional security code or his spoken voice which is verified.

The caller is then given a menu of delivery options for the electronic messages, including:

1. Dial out and send them to my home computer
2. Dial out and send them to my home Fax machine
3. Dial out and send them to a convenient Fax machine at this number
4. I will attach my laptop computer and then send them to me electronically now
5. Read part or all of the messages to me (via text-to-speech) before I decide which to send Depending upon the option selected by the user, the call management computer 101 will respond accordingly including providing translations as needed, e.g., e-mail sent to a Fax machine is converted to Fax format, etc.

The system user may also call his own "One Number", override the greeting message and identify himself using his voice mailbox number and appropriate password. Once identified, the user is provided the same retrieval capabilities as though he had called voice mail, without having to go through the voice mail process described above.

The Call Management System thus provides the means for a system user to retrieve all his electronic messages during a single telephone call to the organization.

16. Voice Mail Handling

The Call Management System utilizes voice mail in four broadly different ways: transferring callers to voice mail, alerting system users to the presence of voice mail messages, as a part of "One-call" message retrieval (see Section 15) and as an integrated subsystem of the overall Call Management System, thereby becoming the organization's voice mail, providing expanded voice mail capabilities to system users.

16.1 Transferring Callers to Voice Mail

The Call Management System eliminates "voice-mail-jail", to which callers are so commonly subjected, because only system users send calls to voice mail, not automated machines as in the past. Callers to system users are transferred to voice mail only because the user makes that choice directly or because of predetermined VIP rules.

When a call is transferred to voice mail (see Sections 1 and 8), the call is transferred to the organization's internal voice mail extension, kept in the call management database 215, and the extension number of the called party, also from the call management database, is entered by the attached DSP 208 to tell the voice mail system, whether integrated with the PBX or not, which voice mailbox to use. The call management computer 101 records the length of time the caller uses the voice mail as part of the voice mail log, from which the called party can obtain some additional knowledge about the caller's message, or lack thereof. Even if no message is left, the call log reflects to the user that the call was received, allowing the called party to return the call using only the click of his mouse.

The Call Management System also provides a "fake" voice mail capability to which an annoying caller can be sent, appearing like normal voice mail but without recording any message.

16.2 Alerting System Users to New Voice Mail Messages

The Call Management System alerts each system user to the presence of new voice mail messages. The alerts are subscreens of the "Voice Mail" part of the "Message Board" of the call management window 115, as described in Section 8. Included are:

1. The name of the caller
2. The date and time of the call
3. The length of voice mail message left
4. The telephone number of the caller.

The user may go to the voice mail system to hear his messages and/or he may return the call directly from the voice mail subscreen by a click of his mouse, or he may delete the notification about the voice mail message.

For Call Management System integrated voice mail subsystems (see below) and other voice mail systems which can integrate with digital network(s) and computer-based systems, the Call Management System provides additional features of:

1. Alerting system users to the presence of all new voice mail messages, not just those received through the Call Management System, including those calls for which no message was left.
2. Retrieving the voice mail messages directly following mouse-click selection from the voice mail alert screen.
3. Message selection can be made by the user in any order.
4. Having the Call Management System establish a voice pathway to the user and then instructing the voice mail system to play out the messages selected through that voice pathway.
5. Returning calls by the click of the mouse.

16.3 Integrated Voice Mail Subsystem

When the Call Management System provides the integrated voice mail for the organization, the voice mail is tightly integrated with the rest of the system, unlike other voice mail systems. Calls transferred to the integrated voice mail are provided the usual array of voice mail caller features, controlled by entry using the telephone keypad. Voice messages are stored either as part of the call management database 215 or as part of the organization's e-mail or other message storage capabilities 110.

System users are alerted to and may review and activate their voice mail messages from their voice mail alert screen in any order, knowing who each caller is and the length of their voice mail message. When a voice mail message is selected to be heard by the double-click of a mouse or otherwise, the call management computer 101 creates a voice pathway to the user's telephone instrument 106, if one is not already present, which it then uses to play back the selected voice mail messages from the call management database or other storage. During playback, many new capabilities are provided the user including:

1. Knowing the identity of the caller and the length of each voice mail message
2. Selecting voice mail messages to be heard in any order
3. Playback controls over speedup and slowdown, backup, fast forward, fast reverse, and many others which have limited availability with conventional voice mail systems 4. Returning the calls with the click of the mouse
5. Many others.

With integrated voice mail, the user can send a call to voice mail and, once free from other tasks, retrieve that call.

Integrated voice mail removes the limitations and barriers of existing voice mail systems, affording system users much more information and entirely new capabilities for its use.

17. User Status

The current dynamic status of all system users is made available to other system users through their call management window. Knowing the current status of users improves the ability of members of an organization to communicate both within the organization and externally with their customers and prospects.

The user status of all system users 111, 113 is continuously maintained by the system through the user's call management window 115 on their workstation 114 and the call management database 215, as described in Section 8. The system user may change his status at any time, selecting among a variety of status conditions:

1. "Available to receive all calls",
2. "Available only for VIP calls",
3. "Unavailable—transferred to another workstation",
4. "Unavailable for all calls",
5. and others.

When the user selects the item 4 "unavailable" option, he is given a list of potential reasons from which he may choose, e.g., "Out of the Office", "Out to lunch", "On vacation", etc. He may choose one of these, choose one and modify it or type in anything else he wishes, e.g., "Away from my desk til 2:00", "Out of the office back Friday", "Giving a demo til 10:00" etc.

When the user is in one of the "available" states, the system automatically applies appropriate status, e.g., "On the phone", "Not responding to calls", etc.

Whenever a system user needs to transfer a call, conference a call, contact another user or any number of other reasons, the call management window's "Directory" as accessed in a variety of ways, (see Section 8) provides the means to determine the current status of other system users. Obviously, if another user is not available, there is no use trying to transfer or conference that person with the existing call.

18. Fault Tolerance and "Copper Bypass"

Call Management System fault tolerance is accomplished in two ways, "copper bypass" and "dual system" configurations.

18.1 "Copper Bypass" Fault Tolerance

For Call Management Systems having the same kind and number of trunks on both the CO and PBX sides 102, 202, 105, 205 "copper bypass" fault tolerance is provided. "Copper bypass" is implemented through an external set of physical switches 1001, FIG. 10*a*, which are arranged so that, when deactivated, the CO trunks "bypass" the Call Management System altogether, connecting directly to the PBX trunks, removing the call management computer 101, 201 from the configuration, connecting the CO directly to the PBX.

The switches in the copper bypass box are normally energized by a signal from the DSP motherboard 1008, connecting the CO and PBX trunks to the call management computer 101, 201. The normal energized state continues so long as:

1. The power to the call management computer 101, 201 remains
2. The call management computer 101, 201 continues to operate in an appropriate manner and to refresh the switch control circuit on a regular basis, at least every few seconds 3. The DSP processors continue to operate as programmed.

If any of these conditions fail, the switches are deactivated and the system is instantly removed from connection to the CO and PBX trunks and the trunks are bridged together, attaching the CO 103 to the organization's PBX 104 as before, allowing telephone service to be restored, but without the new Call Management System features.

18.2 "Dual-System" Fault Tolerance

Dual-system fault tolerance is used for configurations in which CO trunk to PBX trunk conversions are implemented, or for configurations requiring a very high degree of up-time reliability where essentially no down-time is acceptable.

Dual-system fault tolerance is provided through implementing dual call management computers 101 with their trunk interface boards 203, 206, 207, telephony buses 210, circuit switches 204, DSP processors 208, digital network connections 209 and databases 215. During normal operations, one of the computers is connected to the CO and PBX trunks 202, 205 and is providing the Call Management System features. The other backup system is also alive, attached to the data pathway 109 but not to the CO and PBX trunks. Both systems remain alive during normal operations in order to maintain equality of the two copies of the databases via the digital network. An alternative to this process is to keep the Call Management Databases 215 on the LAN server 110 or elsewhere instead of on the call management computer 101.

Figure 10B:
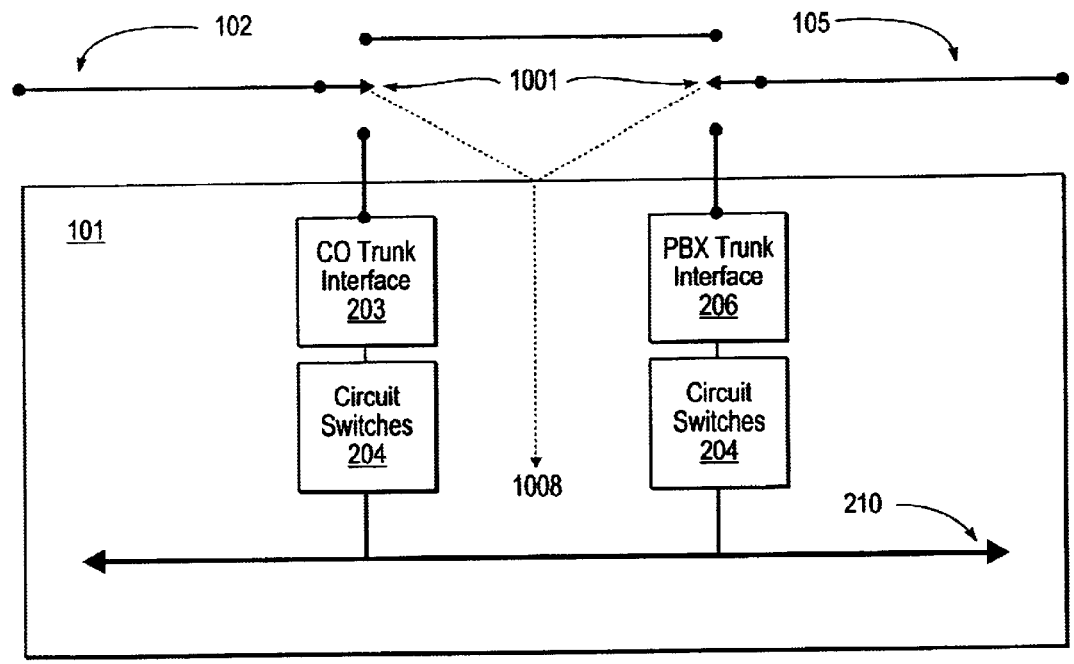
FIGS. 10a and 10b show "copper bypass" configurations for Call Management System fault tolerance.
Figure 10A:
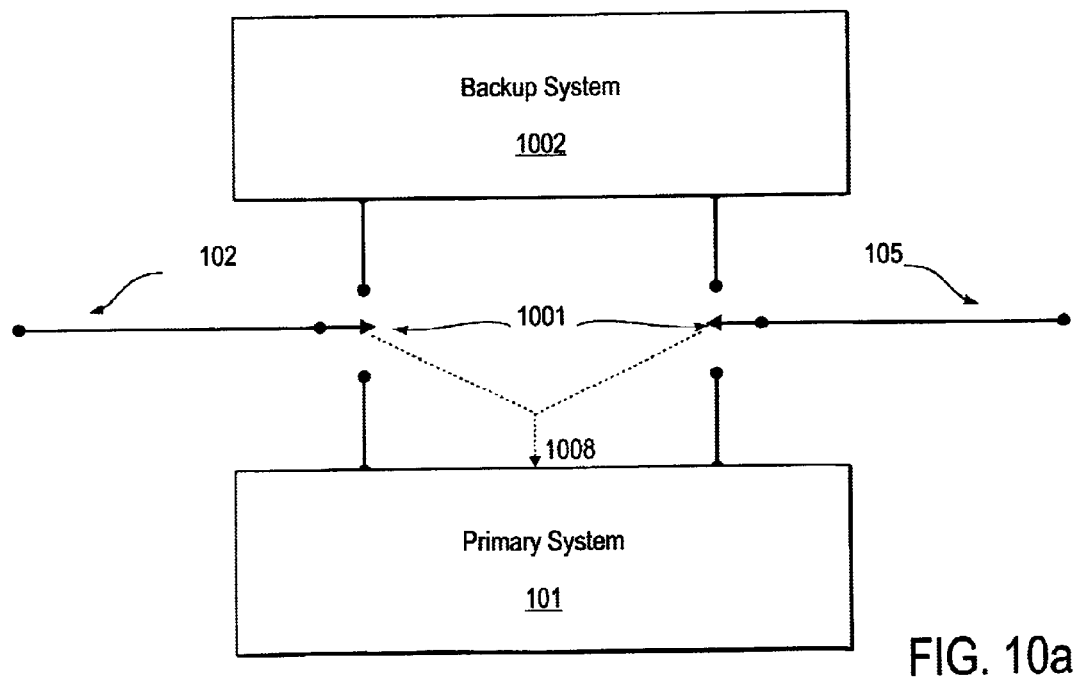

When the primary system fails, the backup system is switched in-line in its place allowing business operations to continue while the other system is repaired and placed back in service. This process requires the Call Management Databases 215 to be "equalized" prior to the repaired system being placed on "backup" status, assuming they are kept on the call management computer 101, 201. Switching the CO and PBX trunks from the "primary" system to the "Backup" system is done automatically using variations of the copper bypass boxes, as shown in FIG. 10b.

What we claim is:

1. A call management system comprising:
   a. at least one user position, comprising a computer workstation and associated telephone apparatus;
   b. a call management computer;
   c. a digital data network connecting the workstation of said at least one user position with said call management computer;
   d. said call management computer including means for intercepting an incoming call to said at least one user position from a calling party;
   e. means for determining that an intercepted call is for said at least one user position;
   f. means for interacting with the workstation of said at least one user position to determine how the intercepted call is to be processed;
   g. and means for processing the call according to instructions received from the workstation of the called user, wherein said call management computer includes means for identifying the calling party.

2. A call management system in accordance with claim 1 wherein said means for identifying which user was called uses direct inward dialing signals.

3. A call management system in accordance with claim 1 wherein said means for identifying which user was called uses DNIS signals.

4. A call management system in accordance with claim 1 wherein said means for identifying which user was called uses ISDN signals.

5. A call management system in accordance with claim 1 wherein said means for identifying which user was called uses voice recognition apparatus to identify the called party's name when spoken by the caller.

6. A call management system in accordance with claim 1 wherein said means for identifying which user was called uses Internet screen forms filled in by the caller.

7. A call management system in accordance with claim 1 wherein said means for identifying which user was called includes requesting that the caller enter information and using that information to identify the called user.

8. A call management system in accordance with claim 7 wherein said information includes the called party's extension number.

9. A call management system in accordance with claim 7 wherein said information includes spelling or partial spelling of the called party's name on the telephone keypad by the caller.

10. A call management system in accordance with claim 7 wherein said information includes the called party's name or a portion thereof as spoken by the caller.

11. A call management system in accordance with claim 1 wherein said means for identifying the calling party uses ANI signals.

12. A call management system in accordance with claim 1 wherein said means for identifying the calling party uses BCLID signals.

13. A call management system in accordance with claim 1 wherein said means for identifying the calling party uses ISDN signals.

14. A call management system in accordance with claim 1 wherein said means for identifying the calling party uses Caller ID signals.

15. A call management system in accordance with claim 1 wherein said means for identifying the calling party uses DTMF signals.

16. A call management system in accordance with claim 1 wherein said means for identifying the calling party uses FSK signals.

17. A call management system in accordance with claim 1 wherein said means for identifying the calling party includes requesting that the caller enter information and using that information to identify the caller.

18. A call management system in accordance with claim 17 wherein said information includes entry of a telephone number.

19. A call management system in accordance with claim 18 wherein said telephone number is the caller's home telephone number.

20. A call management system in accordance with claim 18 wherein said telephone number is the caller's business telephone number.

21. A call management system in accordance with claim 18 wherein said telephone number is the caller's business telephone number plus the extension number.

22. A call management system in accordance with claim 18 wherein said information includes entry of a personal identification number.

23. A call management system in accordance with claim 17 wherein said information includes speaking an identifying word or phrase.

24. A call management system in accordance with claim 23 wherein said identifying word or phrase is the caller's name or a portion thereof.

25. A call management system in accordance with claim 1 wherein said means for identifying the calling party includes storage containing at least one caller ID database.

26. A call management system in accordance with claim 25 wherein said at least one caller ID database is updated with information whenever a call is received from a caller not in said caller ID database.

27. A call management system in accordance with claim 26 wherein said at least one caller ID database contains the telephone numbers and listed names of potential callers.

28. A call management system in accordance with claim 26 wherein said at least one caller ID database contains representations of the voices of callers.

29. A call management system in accordance with claim 26 wherein said at least one caller ID database contains Internet addresses of callers.

30. A call management system in accordance with claim 26 wherein said at least one caller ID database contains e-mail addresses of callers.

31. A call management system in accordance with claim 1 wherein said means for processing calls includes apparatus for playing a pre-recorded message to the caller.

32. A call management system in accordance with claim 1 wherein said system includes one or more processing rules applicable to at least one caller which determine at least in part how calls from that at least one caller are processed.

33. A call management system in accordance with claim 32 wherein said call management system includes storage for said processing rules.

34. A call management system in accordance with claim 32 wherein which of said processing rules is applicable is determined at least in part by the identity of the called user.

35. A call management system in accordance with claim 32 wherein which of said processing rules is applicable is determined at least in part by the current status of the called user.

36. A call management system in accordance with claim 35 wherein the current status of the called user includes whether or not he or she is on the phone.

37. A call management system in accordance with claim 35 wherein the current status of the called user includes whether or not he or she is available to receive calls.

38. A call management system in accordance with claim 35 wherein the current status of the called user includes whether or not he or she is accepting only priority calls.

39. A call management system in accordance with claim 35 wherein the current status of the called user includes his or her current location.

40. A call management system in accordance with claim 35 wherein which of said processing rules is applicable is determined at least in part by the current date, day of the week and/or time of day.

41. A call management system in accordance with claim 32 wherein said processing rules include instructions for routing calls from at least one caller to a destination other than the user position.

42. A call management system in accordance with claim 41 wherein said other destination is a destination on the public switched telephone network.

43. A call management system in accordance with claim 41 wherein said other destination is another user position.

44. A call management system in accordance with claim 41 wherein said other destination is a destination on the Internet.

45. A call management system in accordance with claim 41 wherein said other destination is a voice mailbox.

46. A call management system in accordance with claim 32 wherein said processing rules include playing a pre-recorded message to the caller.

47. A call management system in accordance with claim 46 wherein the identity of the called user determines at least in part which pre-recorded message is played.

48. A call management system in accordance with claim 46 wherein said pre-recorded message requests the caller to enter information.

49. A call management system in accordance with claim 48 wherein said entered information is in the form of DTMF signals.

50. A call management system in accordance with claim 48 wherein said entered information is in the form of spoken words.

51. A call management system in accordance with claim 48 wherein said entered information determines at least in part the subsequent processing of the call.

52. A call management system in accordance with claim 32 wherein said call processing rule specifies at least in part that the call be transferred to the called user at a location other than the normal user position.

53. A call management system in accordance with claim 52 further including means for the user to change the location to which the call is to be transferred by calling the call management system and entering appropriate instructions.

54. A call management system in accordance with claim 52 wherein said call processing rule specifies a series of alternate destinations which are to be called.

55. A call management system in accordance with claim 32 wherein said call processing rule specifies at least in part that the call be transferred to a paging service.

56. A call management system in accordance with claim 32 wherein said call processing rule specifies at least in part that the call be transferred to a voice mailbox.

57. A call management system in accordance with claim 32 wherein said call processing rule specifies at least in part that the call be transferred to an alternate location and subsequently transferred back to the called user.

58. A call management system in accordance with claim 32 wherein said call processing rule specifies at least in part that another call processing rule should be applied to the call.

59. A call management system in accordance with claim 32 wherein said call processing rule specifies at least in part that a special ringing sound should be used for the call.

60. A call management system in accordance with claim 32 wherein said call processing rule specifies at least in part that the call should be disconnected.

61. A call management system in accordance with claim 32 wherein said call processing rule specifies at least in part that the call should be placed on hold.

62. A call management system in accordance with claim 46 wherein the user may call the system and re-record the pre-recorded message(s), changing content as desired.

63. A call management system in accordance with claim 32 wherein which of said processing rules is applicable is determined at least in part by the identity of the calling party.

64. A call management system in accordance with claim 46 wherein the identity of the calling party determines at least in part which pre-recorded message is played.

65. A call management system in accordance with claim 46 wherein the telephone number of the calling party or a portion thereof determines at least in part which pre-recorded message is played.

66. A call management system in accordance with claim 1, wherein said system includes one or more processing rules applicable to at lest one user which determine at least in part how calls to that at least one user are processed, said rules further including instructions for routing calls from at least one caller to a destination other than the user position, said other destination being a plurality of user positions.

67. A call management system in accordance with claim 1, wherein said system includes one or more processing rules applicable to at least one user which determine at least in part how calls to that at least one user are processed, said rules further including instructions for routing calls from at least one caller to a destination other than the user position, said other destination being an extension number.

68. A call management system in accordance with claim 41 wherein said other destination is a plurality of user positions.

69. A call management system in accordance with claim 41 wherein said other destination is an extension number.

70. A call management system in accordance with claim 32 wherein said interaction with said workstation of said at least one user position includes a command to add the caller to a specific rule.

71. A call management system in accordance with claim 32 wherein said interaction with said workstation of said at least one user position includes a command to apply a selected rule to the call.

72. A call management system in accordance with claim 1 wherein said interaction with said workstation of said at least one user position includes a command to play a pre-recorded message to the caller which is personalized for the specific caller.

73. A call management system in accordance with claim 1, wherein a log of call information on the workstation is maintained for calls placed to and/or from system users, and wherein the interaction with said workstation of said at least one user position includes a command to display some or all of that user's calls as recorded in said call log, said displayed information from said call log being restricted to outbound calls from the user.

74. A call management system in accordance with claim 1, wherein a log of call information of the workstation is maintained for calls placed to and/or from system users, and wherein the interaction with said workstation on said at least one user position includes a command to display some or all of that user's calls as recorded in said call log, said displayed information from said call log being restricted to calls received and/or placed after a certain time of event.

75. A call management system in accordance with claim 1, wherein a log of call information on the workstation is maintained for calls placed to and/or from system users, and wherein the interaction with said workstation of said at least one user position includes a command to display some or all of that user's calls as recorded in said call log, said user being able to select a particular call from said call log and command that a call be placed to that caller.

* * * * *